(12) United States Patent
Bertola et al.

(10) Patent No.: US 8,036,450 B2
(45) Date of Patent: Oct. 11, 2011

(54) ELECTRONIC PHOTO-OPTICAL SYSTEM FOR SURVEYING, DIGITALIZING AND REPRODUCING THE EXTERNAL SURFACE OF A THREE-DIMENSIONAL OBJECT, EITHER VIRTUALLY OR IN PLASTIC, COMPOSITE OR PAPERY MATERIAL

(76) Inventors: Paolo Bertola, Lecco (IT); Francesca Julita, Lecco (IT)

( * ) Notice: Subject to any disclaimer, the term of this patent is extended or adjusted under 35 U.S.C. 154(b) by 1048 days.

(21) Appl. No.: 10/588,399

(22) PCT Filed: Jan. 24, 2005

(86) PCT No.: PCT/EP2005/000646
§ 371 (c)(1),
(2), (4) Date: Apr. 26, 2007

(87) PCT Pub. No.: WO2005/076094
PCT Pub. Date: Aug. 18, 2005

(65) Prior Publication Data
US 2007/0285668 A1   Dec. 13, 2007

(30) Foreign Application Priority Data
Feb. 3, 2004  (IT) ............................. MI2004A0166

(51) Int. Cl.
*G06T 17/00*  (2006.01)
*G01B 11/00*  (2006.01)

(52) U.S. Cl. .......... 382/154; 356/606; 700/118
(58) Field of Classification Search .......... 382/154; 700/118–120, 163, 182; 356/601–610
See application file for complete search history.

(56) References Cited

U.S. PATENT DOCUMENTS

| 4,001,069 | A |   | 1/1977  | DiMatteo |
| 4,575,805 | A | * | 3/1986  | Moermann et al. ........... 700/163 |
| 4,752,964 | A | * | 6/1988  | Okada et al. .................. 382/154 |
| 5,027,281 | A | * | 6/1991  | Rekow et al. ................. 700/182 |
| 5,460,758 | A | * | 10/1995 | Langer et al. ................. 264/401 |
| 5,487,012 | A |   | 1/1996  | Topholm et al. |
| 5,793,015 | A |   | 8/1998  | Walczyk |
| 6,424,877 | B1| * | 7/2002  | Kondo et al. .................. 700/117 |

FOREIGN PATENT DOCUMENTS

| DE | 101 32 226 A1 | 1/2003 |
| EP | 0 348 247     | 12/1989 |
| EP | 0 163 076 B1  | 11/1991 |
| EP | 1 151 778 A1  | 7/2001 |
| WO | WO 2004/069508 A2 | 8/2004 |

* cited by examiner

*Primary Examiner* — Jon Chang
(74) *Attorney, Agent, or Firm* — Gottlieb, Rackman & Reisman, PC

(57) ABSTRACT

The acquisition and reproduction units of the system are interconnected by means of a network in order to survey and regenerate the outline of any kind of object and to reproduced it either virtually in a CAD 3D system or materially in plastic, composite or papery material.

9 Claims, 12 Drawing Sheets

ELECTRONIC PHOTO-OPTICAL SYSTEM FOR SURVEYING, DIGITALIZING AND REPRODUCING THE EXTERNAL SURFACE OF A THREE-DIMENSIONAL OBJECT, EITHER VIRTUALLY OR IN PLASTIC, COMPOSITE OR PAPERY MATERIAL

Electronic photo-optical system for surveying, digitalizing and reproducing the external surface of a three-dimensional object, either virtually or in plastic, composite or papery material.

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to an electronic photo-optical system capable of surveying the external outline any kind of object and transform it into a set of Cartesian coordinates (x,y,z); transmitting the mathematical data of these geometries via networks both to a personal computer (to realize a three-dimensional graphical representation of the object and render possible the further processing of its geometry by means of three-dimensional, computer-assisted design, CAD 3D) and directly to an on-line device of the fax-reproducer type for the reproduction in plastic, composite or papery material of the volume of the surveyed object, in an automatic manner and in accordance with a predetermined logic, composite material being here understood as referring to a material obtained by the union of at least two components having chemical and physical characteristics such as to render them different, insoluble and capable of being separated from each other.

2. Prior Art

The prior art relating to the transformation in a personal computer of the outline of any kind of surveyed and digitalized object into the external surface of a three-dimensional (3D) virtual object consists principally of the use of lasers and feelers for determining the space coordinates of the object or three-dimensional reconstruction by means of the acquisition of images from video cameras and video projectors.

The prior art relating to the realization of an object in plastic material or other material by means of data obtained from a CAD 3D system comprises principally the use of lasers and milling cutters; rapid prototyping like stereolithography (SLA); laser sintering (SLS); the LOM method; the FDM method, the 3DP method; the SGC method. Furthermore, the prior art comprises the device for thermoforming, digitalizing and reproducing the external surface of an object in three-dimensions, virtually and/or in thermoformable plastic material, object of Italian Patent Application No. MI 2003 A 000177 and International Application No. PCT/EP 04/00855, in which an integrated module for the calculation and management of information technology (IT) data, a scanner module and a reproduction module are capable of thermoforming external surfaces of objects from panels (sheets) of thermoformable plastic material without having to rely on negative or positive moulds, carrying out 3D scannings of pre-existing objects taken as model, translating them into the external surfaces of virtual objects that can be processed by means of CAD 3D programs, carrying out operations of remote reproduction by means of 3D fax of previously digitalized surfaces or surfaces of objects designed by means of CAD 3D and conserved in a data base, in the form of surfaces of objects thermoformed in thermoplastic material.

DISADVANTAGES OF THE PRIOR ART

The disadvantages of the prior art consist of the very considerable sophistication associated with the conventional scanners and 3D reproducers, with consequent high costs of first purchase and maintenance, which relegate these products to a very restricted and very sectorial market area, principally concentrated in the compartment of fast prototyping for mechanical design and architecture.

BRIEF SUMMARY OF THE INVENTION

The symbols used in the present description are explained in the following

TABLE 1

| Symbol | Description |
|---|---|
| Dides | Employed roll-type and sheet-type supports specifically formulated to be of the plastic, composite or papery material |
| 3D | Numerical matrix of the Cartesian coordinates of the object obj |
| 3Dc | Numerical matrix associated with the colours of the object obj |
| 3Dr | Numerical matrix of the Cartesian coordinates of the real-scale object obj |
| 3Drr | Numerical matrix describing the geometry of the object obj in the radial system |
| 3Drrt | Numerical matrix describing the geometry of the object obj in the radial system with template-cutting information |
| c | Centre of rotation of the plane $\pi$ |
| C | Colour vector |
| c1 | Centre of the plane $\pi 1$ |
| d | Horizontal distance between the centre c of the base plane ($\pi$) and the centre c1 of the reading plane ($\pi 1$) |
| i, j, k | Indices utilized in the matrix computation |
| m | Number of divisions along the $n^{th}$ individual profile of the object obj |
| Mod. A printing | Modality for printing the module VT-MF$^{II}$ for plastic, composite or papery supports of the sheet-type, operated by logic 3Dr and 3Dc |
| Mod. B printing | Modality for printing the module VT-MF$^{II}$ for plastic, composite or papery supports of the roll-type, operated by logic 3Drrt and 3Dc |
| n | Number of planes utilized for scanning the object obj |
| N image | Number of images = t × nf |
| nf = | [images/s] |
| obj | Object that is being scanned |
| P | Matrix of the profiles associated with the levels $z_i$ |
| PC | Personal Computer |
| $P_i$ | Generic point of the profile of the object obj |
| R | Rotation matrix of the system |
| Rg | Winding radius with respect to the axis of rotation |
| Rg0 | Radius of the initial axis of rotation |
| $RP_i$ | Rotation radius described by $P_i$ |

TABLE 1-continued

| Symbol | Description |
| --- | --- |
| S | Thickness of the sheet wound as a spiral around the axis of rotation |
| S image | Displacement associated with the image N image = t × Vz |
| Sf | Scale factor matrix |
| T | Translation matrix from the system $\pi 1$ to the system $\pi$ |
| t | Generic instant of film (image) shooting |
| tg | Cutting information vector |
| Tr | Total time of film shooting |
| v | Vertical distance between the centre c of the base plane ($\pi$) and the centre c1 of the reading plane ($\pi 1$) |
| $VT^{II}$ | Electronic photo-optical device for surveying, digitalizing and reproducing in three-dimensions the external surfaces of an object |
| $VT$-$Data^{II}$ | Integrated module for mathematically calculating and managing informatics data relating to the external surface of the object obj |
| $VT$-$MF^{II}$ | Three-dimensional reproduction module |
| $VT$-$MS^{II}$ | Three-dimensional scanner module |
| Vz = | [mm/s] |
| x | x-axis of Cartesian reference system placed at the centre c of the plane $\pi$ |
| X | X-axis of Cartesian reference system placed at the centre c1 of the plane $\pi 1$ |
| y | y-axis of Cartesian reference system placed at the centre c of the plane $\pi$ |
| Y | Y-axis of Cartesian reference system placed at the centre c1 of the plane $\pi 1$ |
| z | z-axis of Cartesian reference system placed at the centre c of the plane $\pi$ |
| Z | Z-axis of Cartesian reference system placed at the centre c1 of the plane $\pi 1$ |
| $\alpha$ | Angle of inclination of the plane $\pi 1$ with respect to the plane $\pi$ |
| $\pi$ | Base plane (plane on which there rests the object obj) |
| $\pi 1$ | Reading plane (plane in which the images of the object obj are obtained by means of the digital acquisition system) |
| $\theta$ | Winding angle [in degrees] |

The device $VT^{II}$ consists of modules interfaced with each other and capable of virtually acquiring and materially reproducing the external surfaces of any kind of object obj.

The scanning module $VT$-$MS^{II}$ acquires the external coordinates of the outlines of the objects obj subjected to surveying, translating them into an ordered set of three-dimensional Cartesian coordinates.

This information, ordered into a specific numerical matrix, can be utilized for the purposes of carrying out the following operations:

a) Reproduction of the object obj subjected to scanning in plastic, composite or papery material: direct passage from the scanning module $VT$-$MS^{II}$ to the reproduction module $VT$-$MF^{II}$, without intervention to modify the originally acquired data;

b) Reproduction of the object obj subjected to scanning as view of a 3D virtual object obj in a PC: direct passage from the scanning module $VT$-$MS^{II}$ to a PC to be available for both viewing and modification in a three-dimensional computer-assisted design environment;

c) Reproduction in plastic, composite or papery material of the object obj subjected to scanning and modified in a PC or of a virtual object obj designed by means of CAD 3D: direct passage from a PC to reproduction module $VT$-$MF^{II}$ (Mod. A printing and/or Mod. B printing).

Informatics interfaces of the following types may be created with the device:
type 10/100 ethernet board;
modem board;
serial communication port; USB port;
wireless network transmission board.

These solutions assure every type of dialogue between the systems for data transmission and reception; in particular, using the modem board on the scanning device ($VT$-$MS^{II}$) and on the reproduction device ($VT$-$MF^{II}$), direct on-line transmission can be realized between the devices (case [a] of the preceding paragraph) and this makes it possible to regard the former as a transmitting fax and the latter as a receiving fax interlinked for automatic reception.

With a view to making full use of the capacities of the module systems of the device $VT^{II}$, the CAD 3D systems are equipped with specific softwares ($VT^{II}$ softwares) capable of generating files having a format compatible with the reproduction system $VT$-$MF^{II}$, thus making possible the three-dimensional reproduction of objects obj generated entirely by means of CAD 3D and/or modified by information received from the scanning module $VT$-$MS^{II}$.

The electronic photo-optical system $VT^{II}$ for digitalizing and reproducing the outline of an object obj in three-dimensions, virtually and/or in plastic, composite or papery material, is characterized in that it comprises:

A—Module $VT$-$Data^{II}$: integrated mathematical calculation module for managing informatics data that describe the mathematical logic employed by the hardware present in the modules B and C;

B—Module $VT$-$MS^{II}$: scanner module for acquisition of the three-dimensional space coordinates of any kind of surface;

C—Module $VT$-$MF^{II}$: fax-type reproduction module for realizing the three-dimensional outline of scanned surfaces (case B) or of purely virtual surfaces designed in a CAD 3D environment;

said modules being capable of carrying out the operations of:

1 Surveying, by means of a digital photo camera or a digital survey and image acquisition system, the external surface and the associated colour information of any kind of object obj subjected to scanning, obtaining the numerical matrix of the space coordinates of the object obj of type 3Dr and type 3Dc;

2 Generating files compatible with the CAD 3D standards to render the object obj that has been scanned and acquired (as in 1 above) visible in a CAD 3D environment by rendering its surfaces, thus making it possible to intervene and process the data to modify parts of the object obj and/or to add some new ones, and eventually, by means of specific $VT^{II}$ drivers, generate the dedicated files that can be directly interpreted by the reproduction module $VT$-$MF^{II}$;

3 Generating record files to be transferred to the data base of a PC and containing the mathematical data of the numerical matrices 3Dr and 3Dc of the scanned object obj (as per 1 and 2 above), so that they can subsequently be re-used not only for viewing and/or modification, but also for being sent to the reproduction module $VT$-$MF^{II}$ for being reproduced;

4 Transferring the mathematical data of the numerical matrices 3Dr, 3Drrt and 3Dc of the scanned object obj (as in 1 above) by means of modem from the scanner module $VT$-$MS^{II}$ to the reproduction module $VT$-$MF^{II}$ with a view to realizing the coloured outline of the scanned object obj in plastic, composite or papery material of appropriate formulation and creating one or more physical reproductions (Mod. A printing and/or Mod. B printing);

5 Transferring the mathematical data of the numerical matrices 3Dr, 3Drrt and 3Dc of the scanned object obj (as in 1, 2 and 3 above) or of a virtual object obj generated by means of a CAD 3D program from the data base of a PC to the reproduction module $VT$-$MF^{II}$ with a view to realizing the coloured outline of the object obj in plastic, composite or papery material of appropriate formulation and creating one or more physical reproductions (Mod. A printing and/or Mod. B printing).

ADVANTAGES OF THE INVENTION

The advantages of the invented system are as follows:

The scanner module VT-MS$^{II}$ consists of a digital photo camera or a digital survey and image acquisition system of common use, a rotating plane, a LED system mounted on a motor-controlled axis and an integrated hardware part, so that the set of parts constituting the scanner device gives rise to a component cost that is markedly less than the cost standards associated with present-day three-dimensional scanning equipment.

In constructional terms, the reproduction module VT-MF$^{II}$ is comparable to the conventional multifunctional printing systems for office use, such as fax, scanner and photocopier. The overall cost of the device VT-MF$^{II}$ is markedly less than the cost of the present-day rapid prototyping technologies; furthermore, it employs consumption materials (of a plastic, composite or papery nature) that are likewise less costly than the materials (resins, fibres, powders, thermoplastic reagent gels, etc.) employed by the present-day prototyping systems; assuring also the colouring of the reproduced object.

The low cost of the devices and the consumption material, together with the fact that the devices can be interfaced with the external systems, assure that both these devices can be commonly and easily used and render them particularly suitable for an office-type standard with the cost and use requirements peculiar of a consumer-type market.

BRIEF DESCRIPTION OF THE SEVERAL VIEWS OF THE DRAWINGS

Particular embodiments of the invention will now be described in greater detail with the help of the attached diagrammes and drawings, of which.

DETAILED DESCRIPTION OF THE INVENTION

Figure 1:
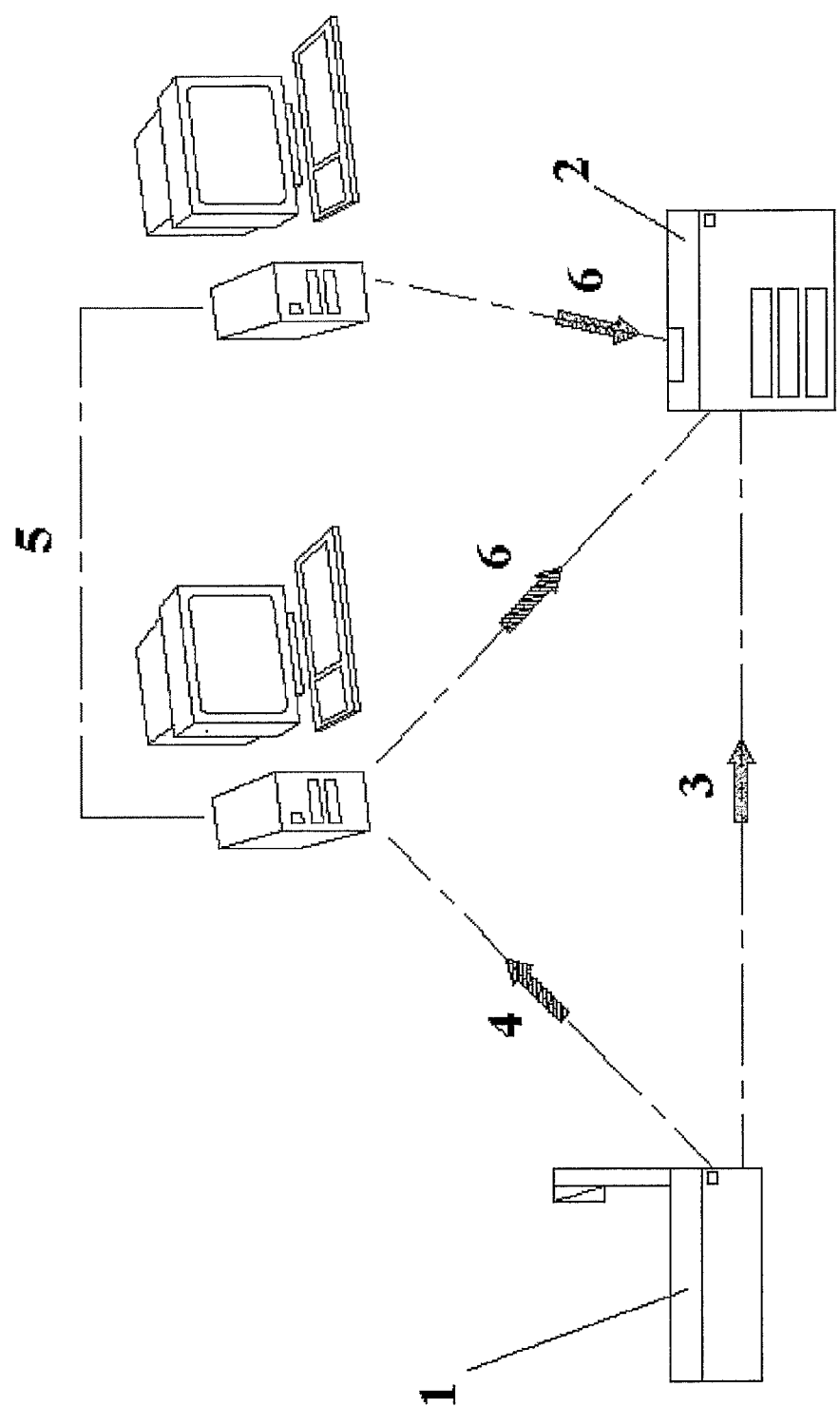
FIG. 1 schematically illustrates the functioning of the device VT$^{II}$.

The manner in which the device VT$^{II}$ functions is schematically illustrated by FIG. 1, where the reference number 1 indicates the three-dimensional scanner apparatus VT-MS$^{II}$, 2 indicates the three-dimensional fax module VT-MF$^{II}$, 3 indicates the system for transmitting data directly from the module VT-MS$^{II}$ to the module VT-MF$^{II}$, 4 indicates the system for transmitting data from the module VT-MS$^{II}$ to the PC for processing, 5 indicates the internet/intranet-type dialogue system between personal computers, and 6 indicates the system for transmitting data from the PC to the module VT-MF$^{II}$.

Figure 2:
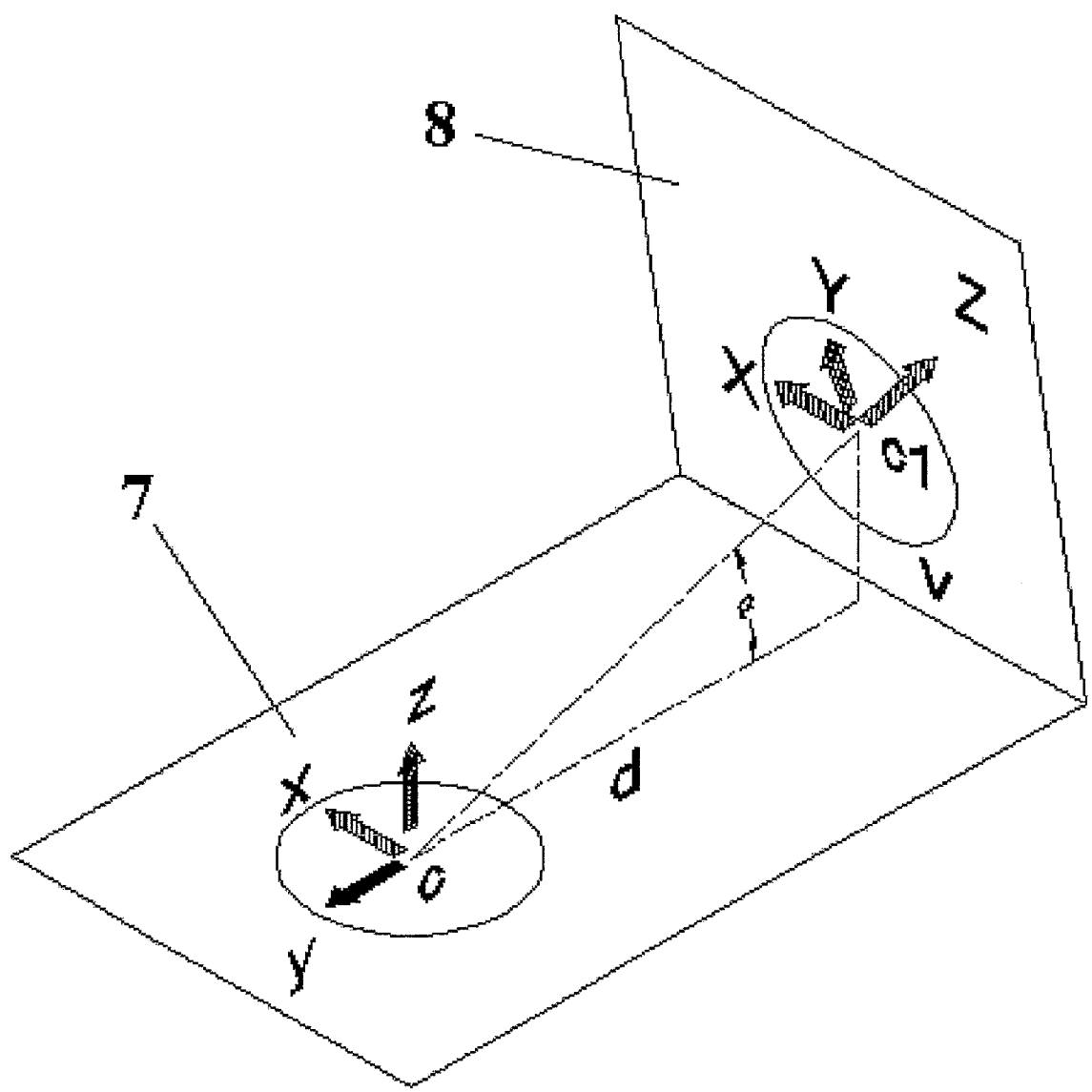
FIG. 2 illustrates the composition of the planes ($\pi$-$\pi1$)

FIG. 2 shows the composition of the planes ($\pi$-$\pi1$), where the reference number 7 indicates the plane $\pi$ on which there is positioned the object obj to be acquired, with reference axes (x,y,z) and centre of rotation c, $\alpha$=angle between the plane $\pi$ and the plane $\pi1$, and 8 indicates the image reception plane $\pi1$, with reference system (X,Y,Z) and centre c1, d=horizontal distance between c and c1, v=vertical distance between c and c1.

Figure 3:
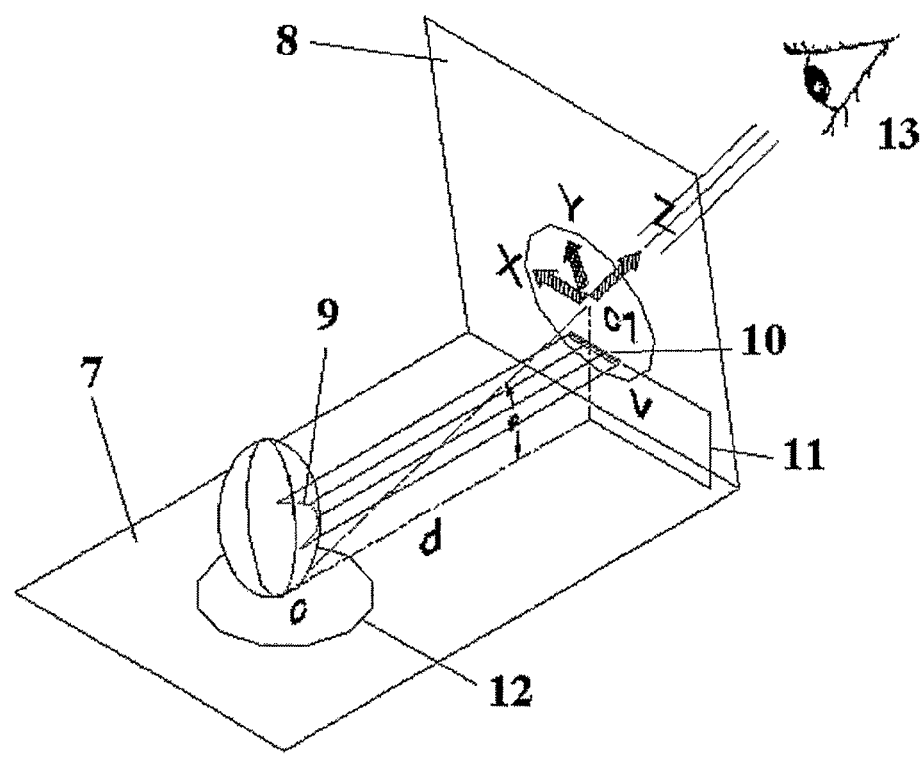
FIG. 3 illustrates the scanning system with the object obj in position and the LED beam.

FIG. 3 illustrates the scanning system with the object obj in position and the LED beam activated, where the reference number 7 indicates the plane $\pi$ on which the object obj to be acquired is positioned, with references axes (x,y,z) and centre of rotation c, $\alpha$=angle between plane $\pi$ and plane $\pi1$, 8 indicates the image reception plane $\pi1$, with reference system (X,Y,Z) and centre c1, d=horizontal distance between c and c1, v=vertical distance between c and c1, 9 indicates the profile of the section identified by the LED beam associated with the vertical level of the LED as per 11, 10 indicates the activated LED beam, 11 indicates the vertical level of the LED and its projection level, 12 indicates the base plane rotating about the centre c as per 7, and 13 indicates the parallel-beam-type observer.

Figure 4:
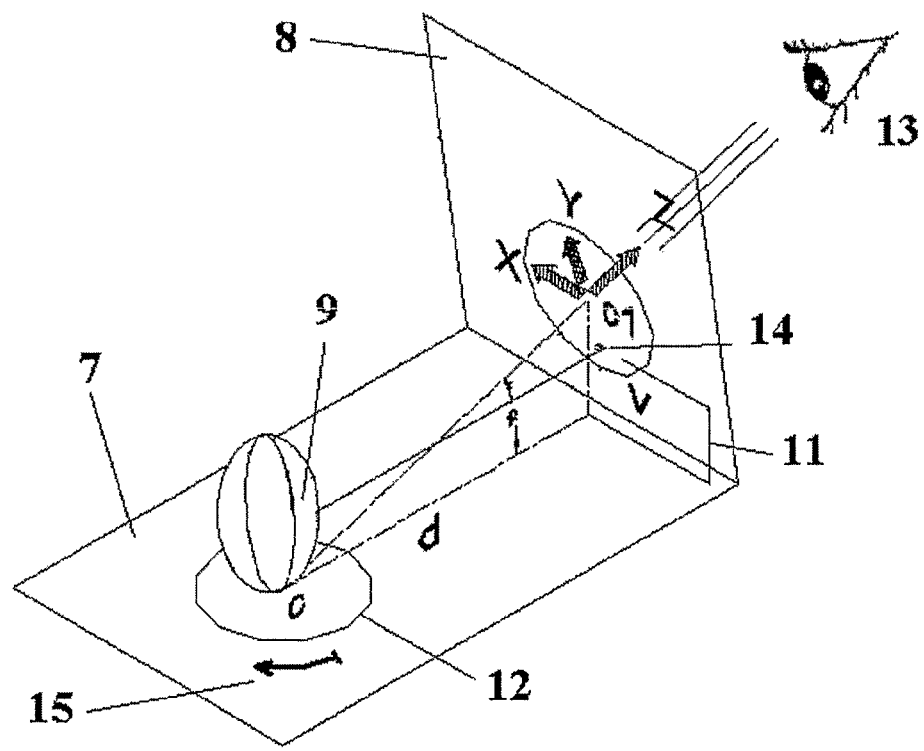
FIG. 4 illustrates the scanning system with the object obj in position and a single LED.

FIG. 4 illustrates the scanning system with the object obj in position and a single-LED beam activated, where the reference number 7 indicates the plane $\pi$ on which the object obj to be acquired is positioned, with reference axes (x,y,z) and centre of rotation c, α=angle between plane π and plane π1, 8 indicates the image reception plane π1, with reference system (X,Y,Z) and centre c1, d=horizontal distance between c and c1, v=vertical distance between c and c1, 9 indicates the profile of the section identified by the LED beam associated with the vertical level of the LED as per 11, 11 indicates the vertical level of the LED and its projection level, 12 indicates the base plane rotating about the centre c as per 7, 13 indicates the parallel-beam-type observer, 14 indicates the activated single-LED beam, and 15 indicates the rotating plane, the rotation being continuous and coordinated with the digital survey on the image plane as in FIG. 2.

Figure 5:
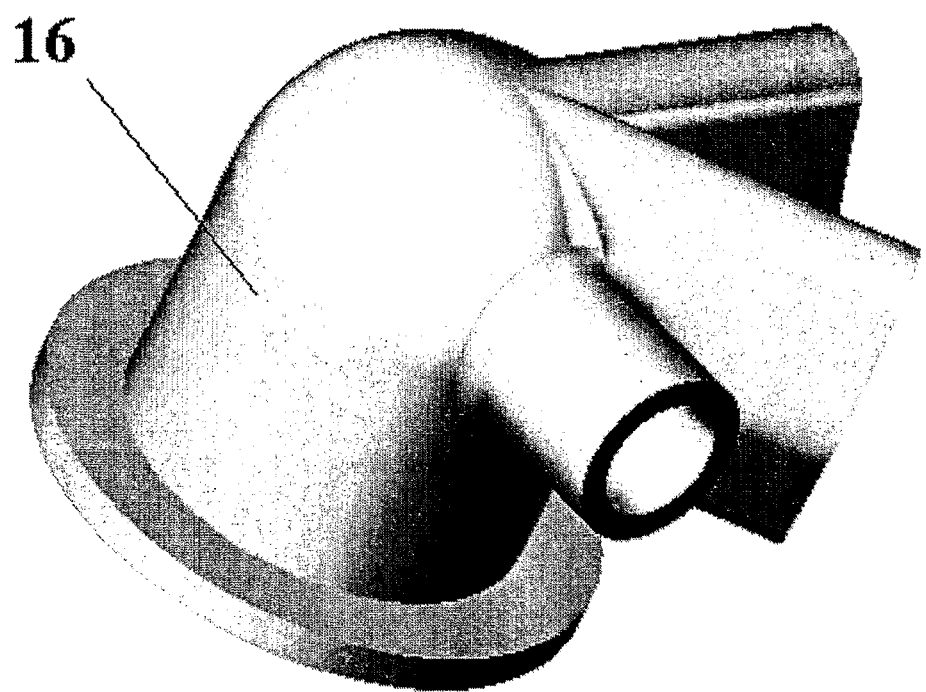
FIG. 5 shows an example of an object obj to be subjected to scanning.

FIG. 5 shows an example of an object obj to be subjected to scanning, the reference number 16 indicates an example of an object obj to be scanned.

Figure 6:
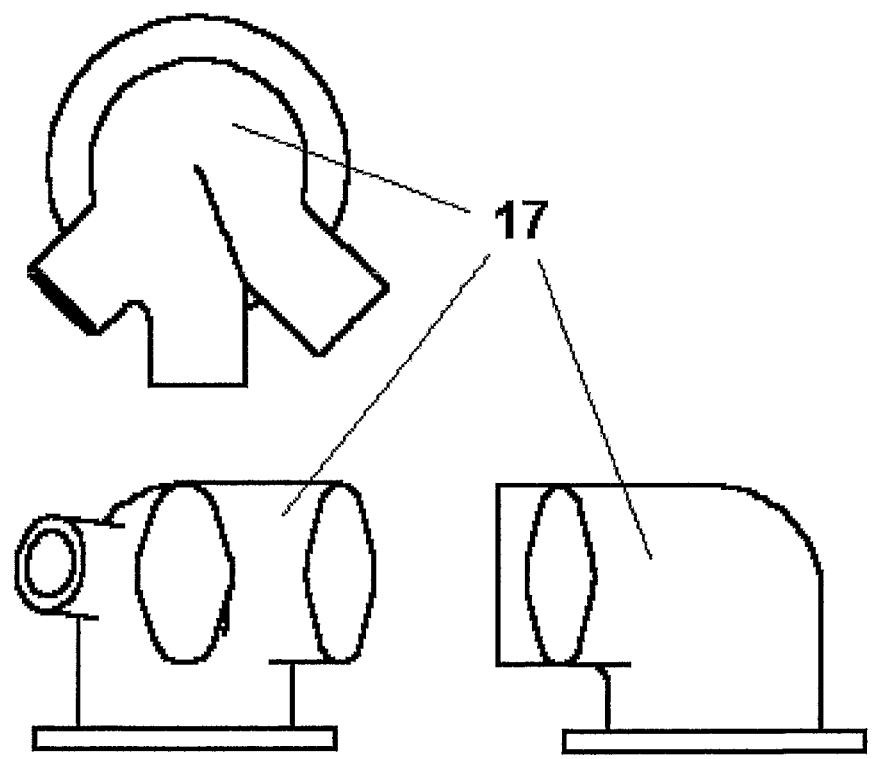
FIG. 6 shows the object obj subjected to scanning as seen in the planes xy, yz, xz.

FIG. 6 shows views of the object obj subjected to scanning as seen in the planes xy, yz, xz, where the reference number 17 indicates the views of the object obj as seen in the planes xy, yz, xz.

Figure 7:
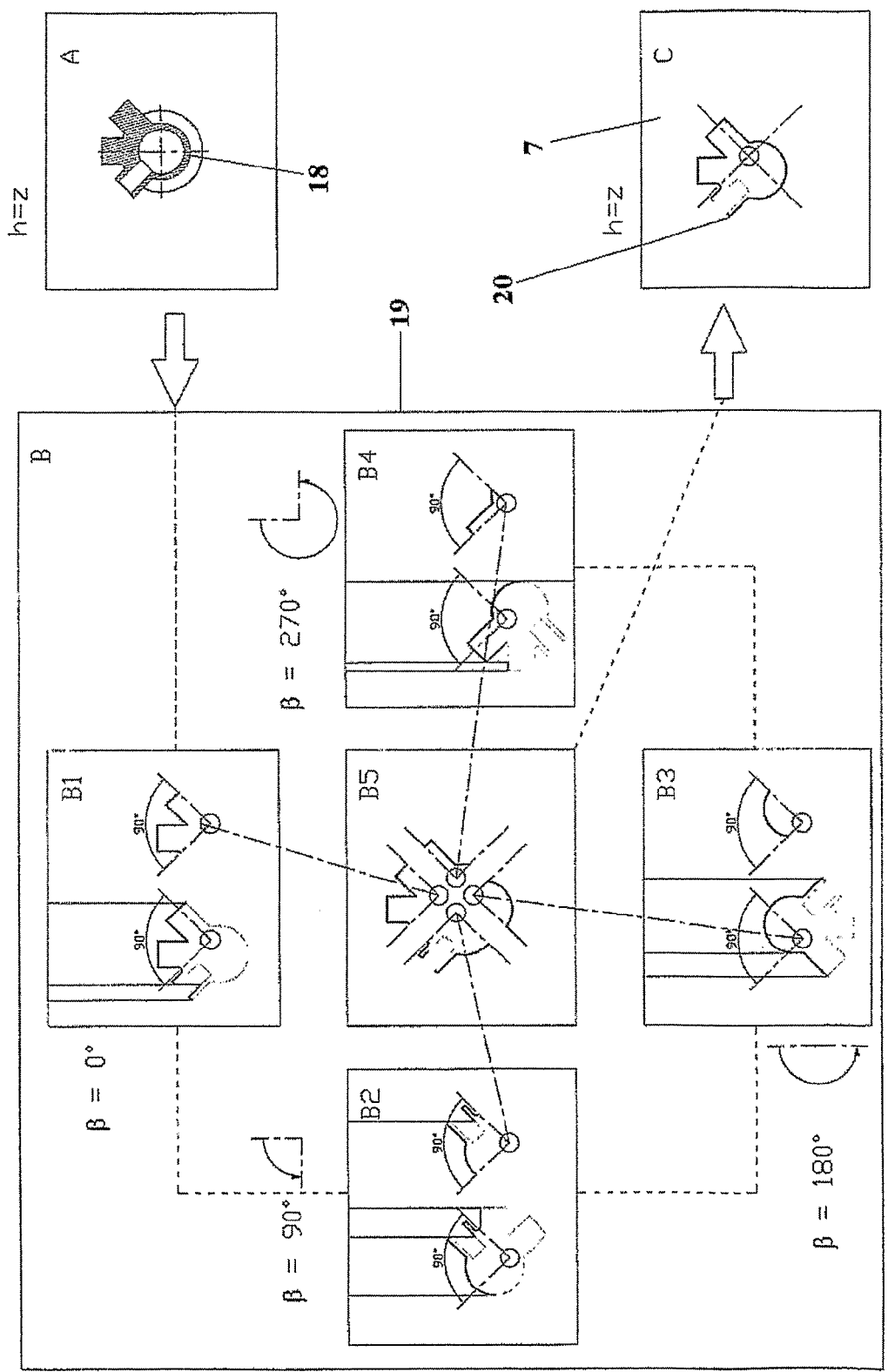
FIG. 7 illustrates the composition of a section at level $z_i$ of the object obj subjected to scanning.

FIG. 7 illustrates the composition of a section at level $z_i$ of the object obj subjected to scanning, where the reference number 7 indicates the plane π on which the object obj to be acquired is positioned, with reference axes (x,y,z) and centre of rotation c, α=angle between plane π and plane π1, 18 indicates the object obj sectioned at a level z as per 11, 19 indicates the system for composing images with 90° segments, and 20 indicates the recomposition of the scanned profile of the object obj with respect to the reference plane (x,y,z) as per 7.

Figure 8:
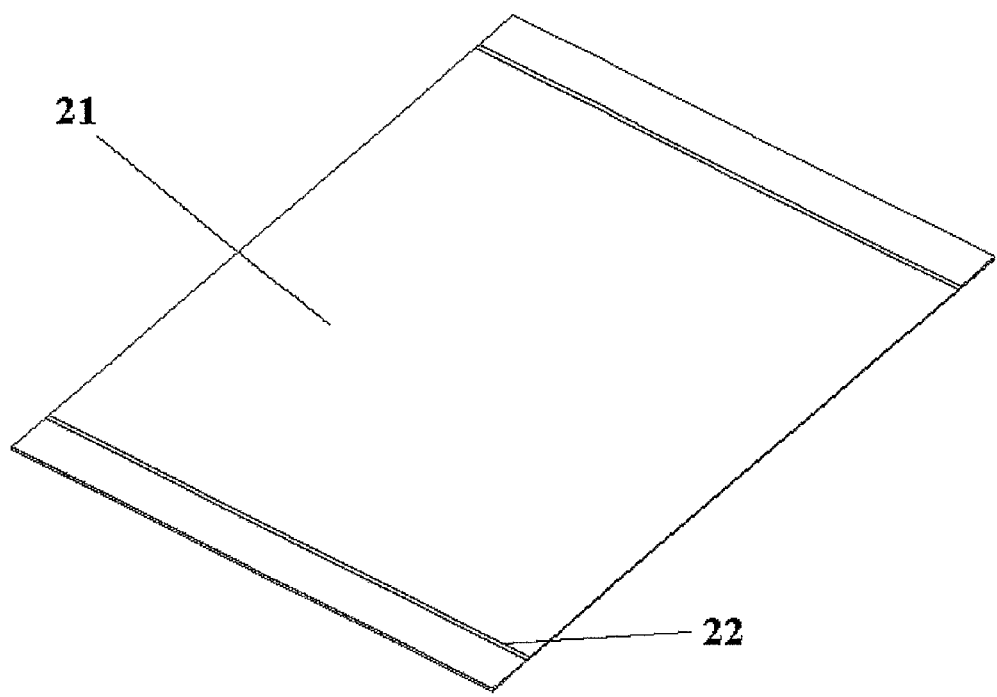
FIG. 8 shows the employed sheet specifically formulated to be of the plastic, composite or papery type (module VT-MF$^{II}$—Mod. A printing)

FIG. 8 shows the employed sheet-type support specifically formulated to be of the, plastic, composite or papery type (module VT-MF$^{II}$—Mod. A printing), with the reference number 21 indicating the format and 22 the specific separation insert.

Figure 9:
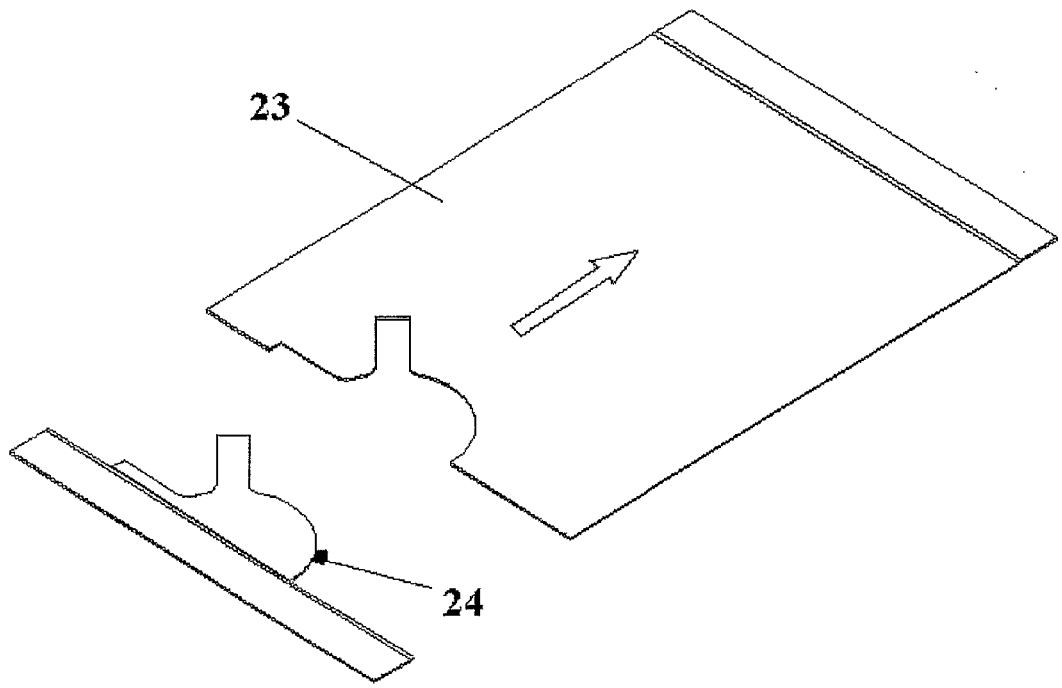
FIG. 9 illustrates the phases of printing—cutting the profile of the outline template-separation of the outline template from the counter-template-activation of the adhesivation-printing the colour on the template profile-positioning on the assembly tray, adhesivation of the sheets-separation of the edge of the sheet-type support (module VT-MF$^{II}$-Mod. A printing)

FIG. 9 illustrates the phases of printing—cutting the profile of the outline template-separation of the template from the counter-template-activation of the adhesivation-printing the colour on the template profile-positioning on the assembly tray, adhesivation of the sheets-separation of the edge of the sheet-type support (module VT-MF$^{II}$—Mod. A printing), where the reference number 23 indicates the separation of the counter-template obtained by the cutting of the support, 24 indicates the colouring of the profile with colour information obtained in accordance with matrix 3Dc logic.

Figure 10:
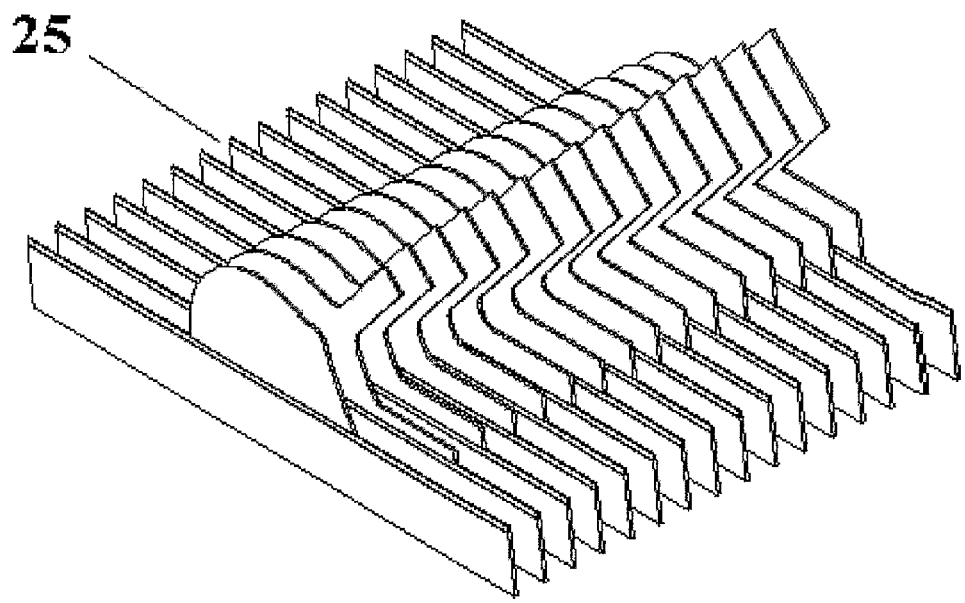
FIG. 10 is a schematic representation of the scanned and reproduced object obj in plastic, composite or papery material (module VT-MF$^{II}$-Mod. A printing)

FIG. 10 is a schematic representation of the scanned and reproduced object obj in plastic, composite or papery material (module VT-MF$^{II}$—Mod. A printing), where the reference number 25 indicates the composition sequence into which the scanned object obj has been subdivided in accordance with matrix 3Dc logic.

Figure 11:
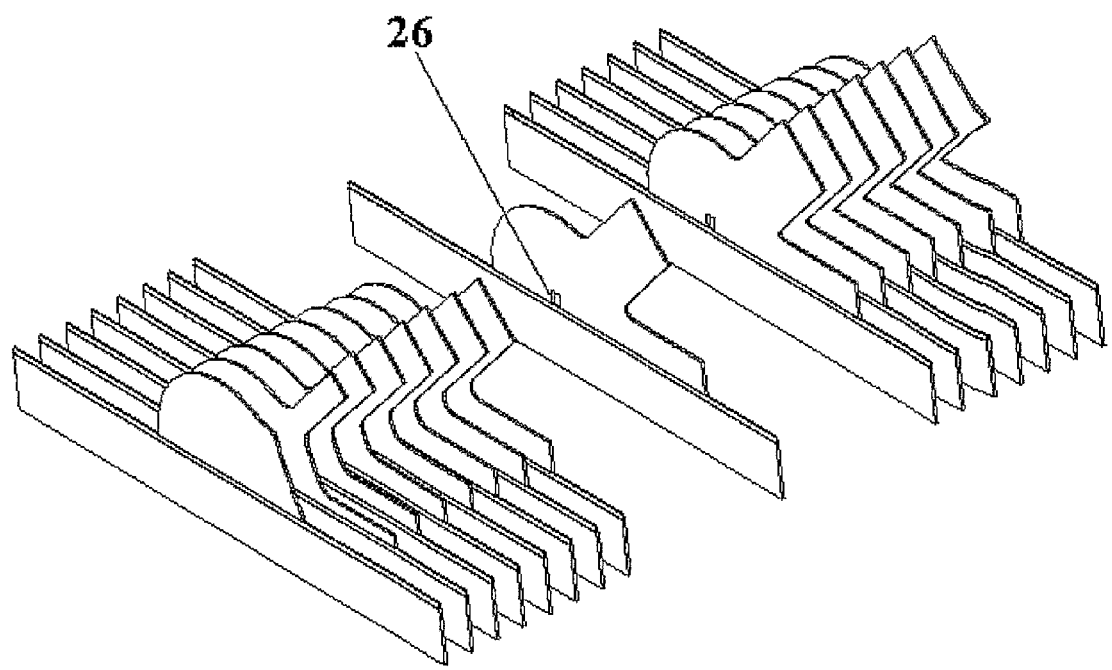
FIG. 11 is a schematic representation of the scanned object obj in the printing phase in the fax device (module VT-MF$^{II}$—Mod. A printing); indicating also the cut-outs for the positioning of the assembly pins, with the cut-outs made so as to be flush with the separation insert of the employed plastic, composite or papery sheet-type support.

FIG. 11 is a schematic representation of the scanned object obj in the printing phase in the reproduction device, showing also the cut-outs for the positioning of the assembly pins, with the cut-outs made so as to be flush with the separation insert of the employed plastic, composite or papery sheet-type support (module VT-MF$^{II}$—Mod. A printing); the reference number 26 indicates the cut-out for the coupling pins positioned so as to be flush with the separation insert of the support.

Figure 12:
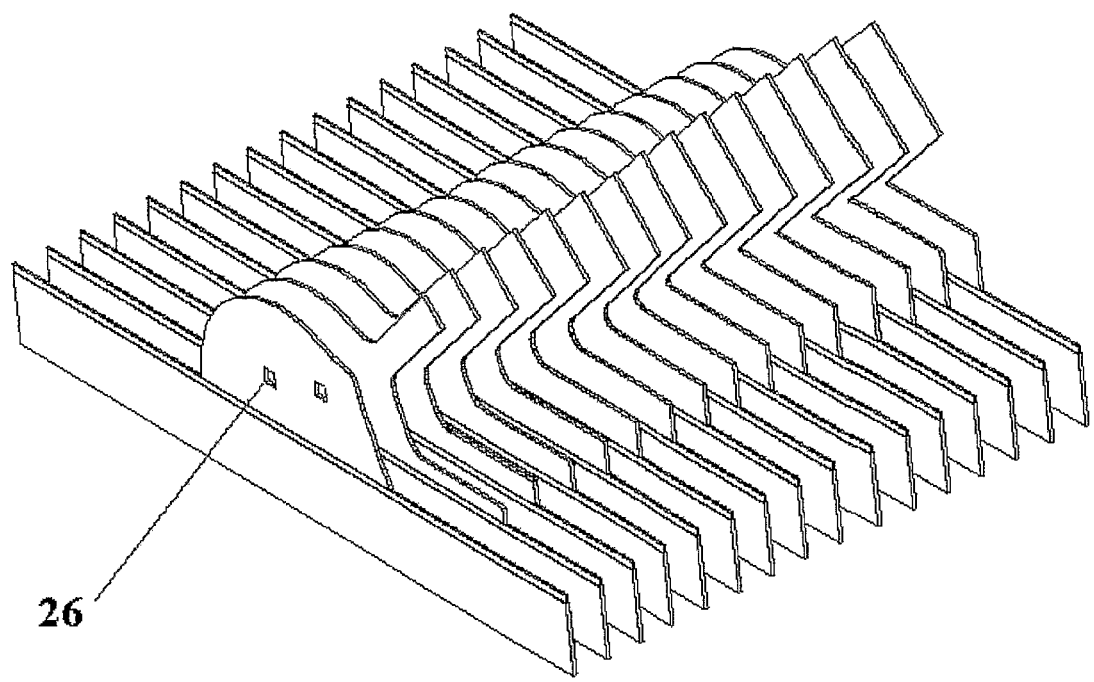
FIG. 12 is a schematic representation of the scanned object obj in the printing phase in the fax device, indicating also the cut-outs for the positioning of the assembly pins, with the cut-outs made in the plane surface of the employed sheet-type support (module VT-MF$^{II}$-Mod. A printing)

FIG. 12 is a schematic representation of the scanned object obj in the printing phase in the reproduction device, showing also the cut-outs for the positioning of the assembly pins, with the cut-outs made in the plane surface of the employed sheet-type support (module VT-MF$^{II}$—Mod. A printing); the reference number 26 indicates the cut-out for the coupling pins positioned on the plane surface of the support.

Figure 13:
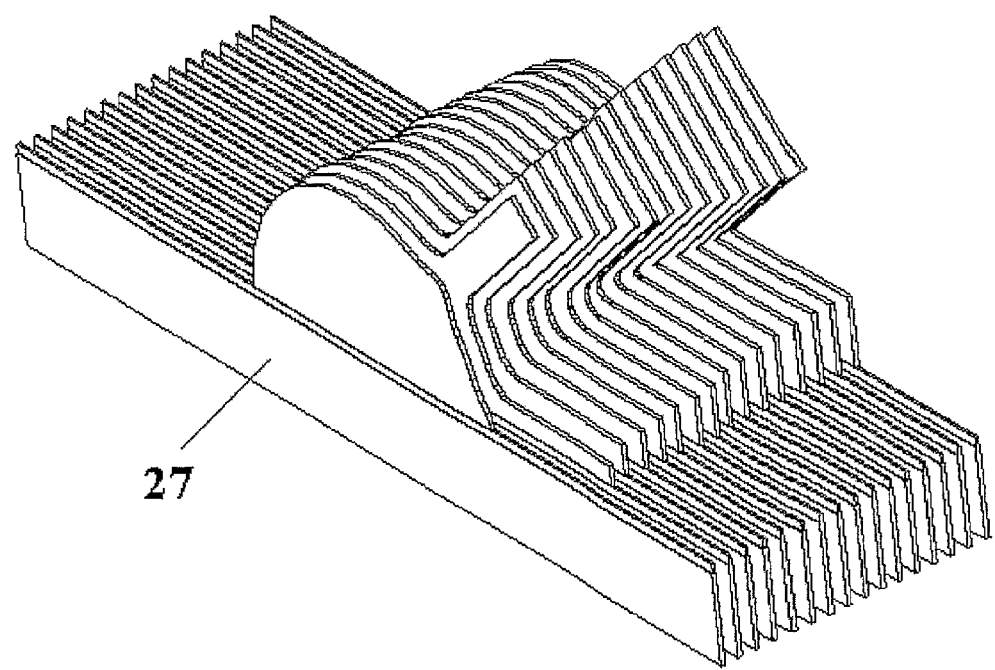
FIG. 13 is a schematic representation of the scanned object obj in the printing phase in the fax device in the adhesivation stage of the planes of the sheet-type support processed in accordance with matrix 3Dr logic (module VT-MF$^{II}$—Mod. A printing)

FIG. 13 is a schematic representation of the scanned object obj in the printing phase in the reproduction device (module VT-MF$^{II}$—Mod. A printing), in the adhesivation stage of the planes of the sheet-type support processed in accordance with matrix 3Dr logic, the reference number 27 indicates the separation edge of the guide plinth that has to be removed when the reproduced parts are assembled by means of the coupling pins.

Figure 14:
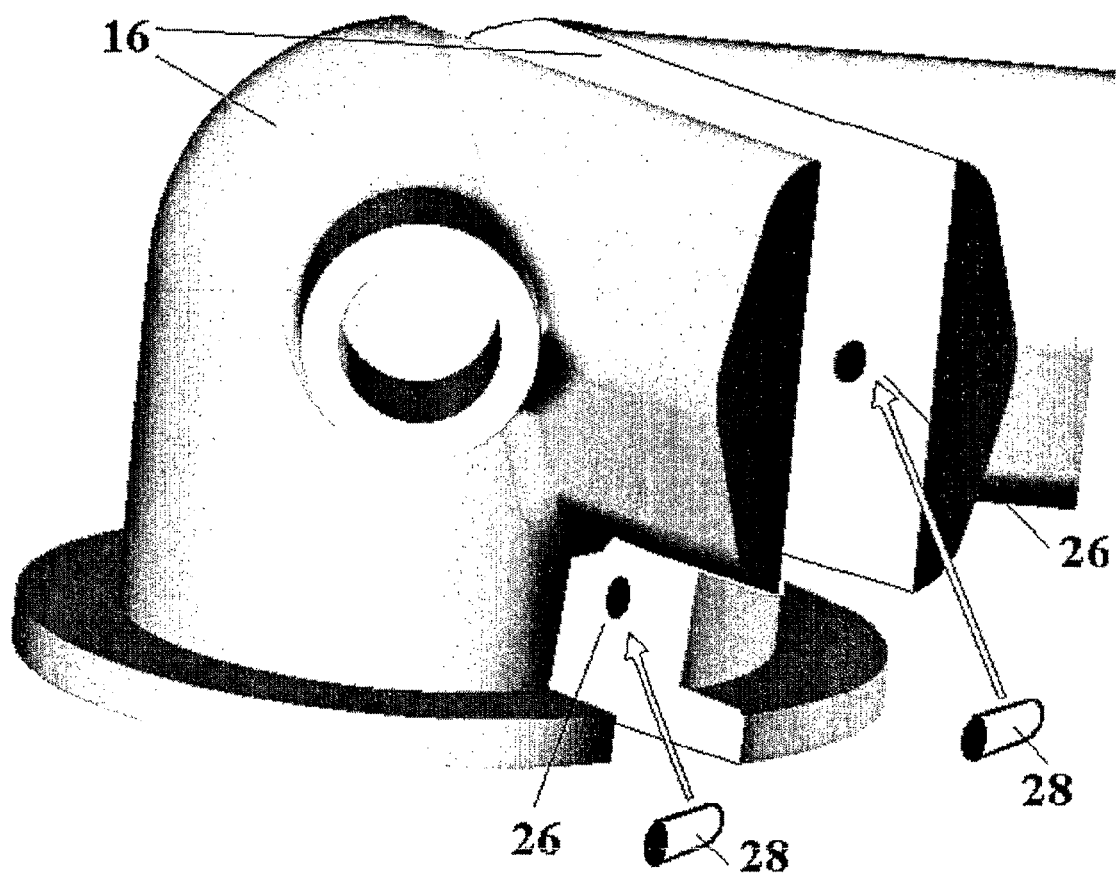
FIG. 14 is a schematic representation of the object obj in the final assembly phase (module VT-MF$^{II}$—Mod. A printing), with the coupling pins to be inserted into the cavities aligned with each other and distributed along the plane union surface of the parts into which the object obj has been decomposed (in accordance with matrix 3Dr logic)

FIG. 14 is a schematic representation of the object obj in the final assembly phase (module VT-MF$^{II}$—Mod. A printing), with the coupling pins to be inserted into the corresponding cavities aligned with each other and distributed along the plane union surface of the parts into which the object obj has been decomposed in accordance with matrix 3Dr logic, the reference number 16 indicates the object obj to be assembled in accordance with matrix 3Dr logic, 26 indicates the cavities for accommodating the pins, and 28 indicates the coupling pins.

Figure 15:
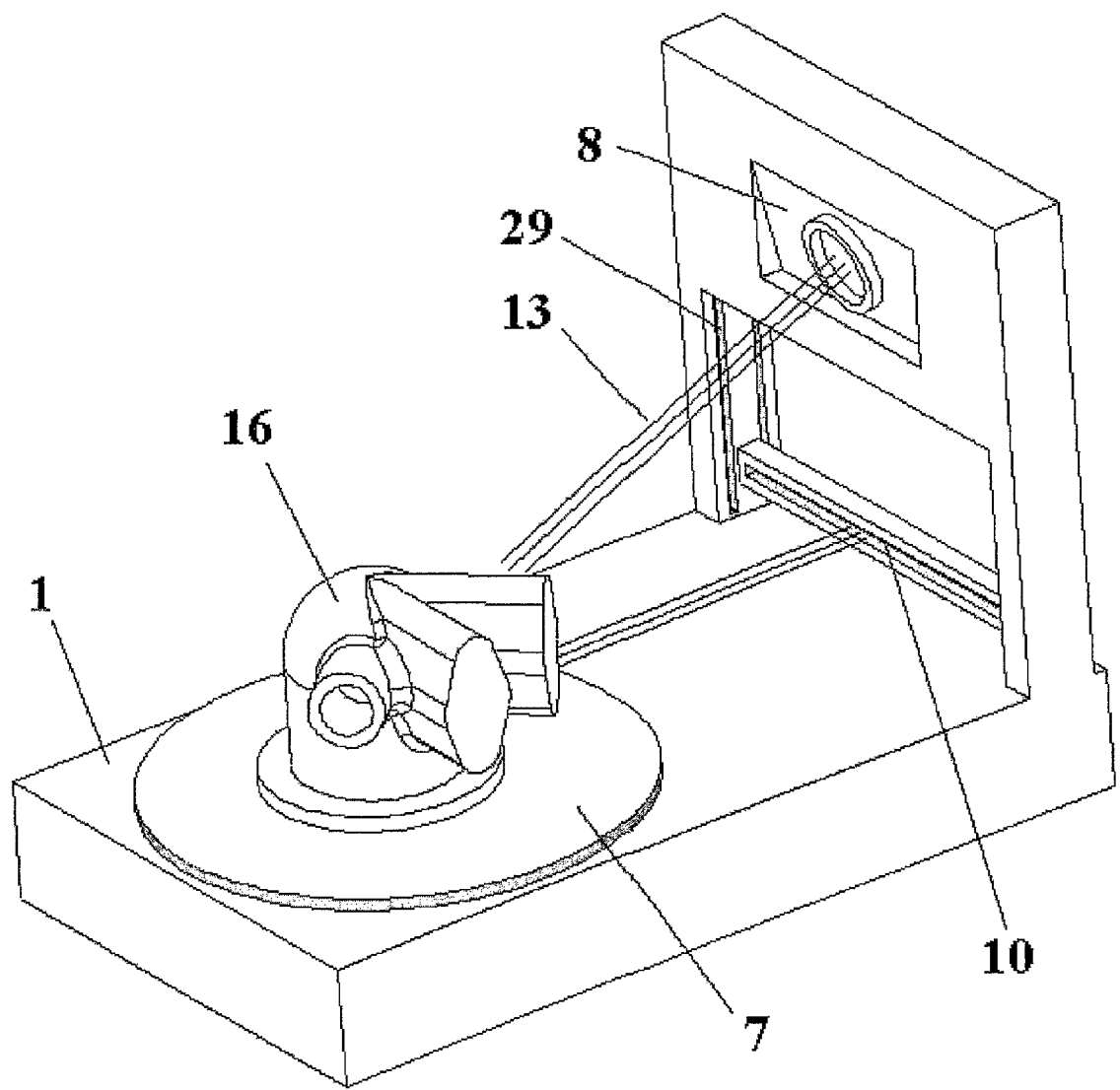
FIG. 15 is a schematic representation of the three-dimensional scanning device VT-MS$^{II}$.

FIG. 15 is a schematic representation of the three-dimensional scanning device VT-MS$^{II}$, where the reference number 1 indicates the scanner device VT-MS$^{II}$, 7 indicates the rotating plane π on which the object obj to be acquired is positioned, with reference axes (x,y,z) and centre of rotation c, 8 indicates the image reception plane π1, with reference system (X,Y,Z) and centre c1, 10 indicates the activated LED beam, 13 indicates the observer/image survey system of the parallel-beam type, 16 indicates object obj that is being acquired, and 29 indicates the guides in which the LED system moves along the vertical directrix z.

Figure 16:
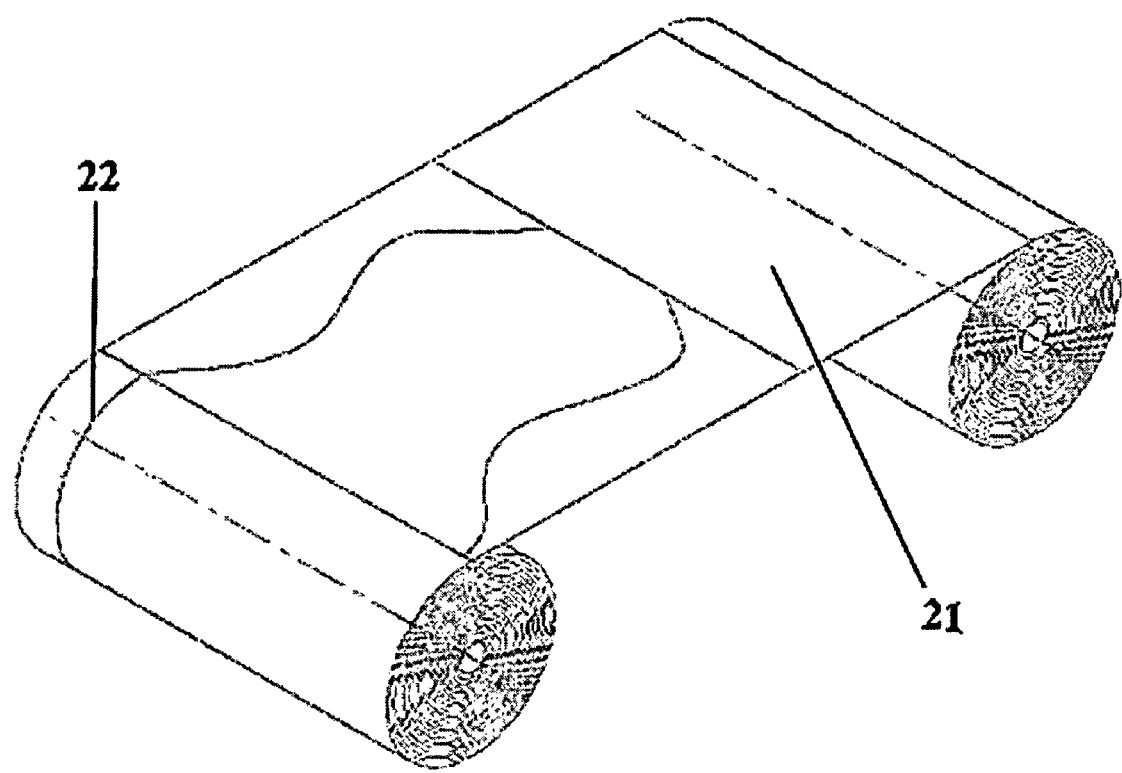
FIG. 16 shows the employed roll-type support specifically formulated to be of the plastic, composite or papery type (module VT-MF$^{II}$—Mod. B printing)

FIG. 16 shows the employed roll-type support specifically formulated to be of the plastic, composite or papery type (module VT-MF$^{II}$—Mod. B printing), with the reference number 21 indicating the format and 22 the specific separation insert.

Figure 17:
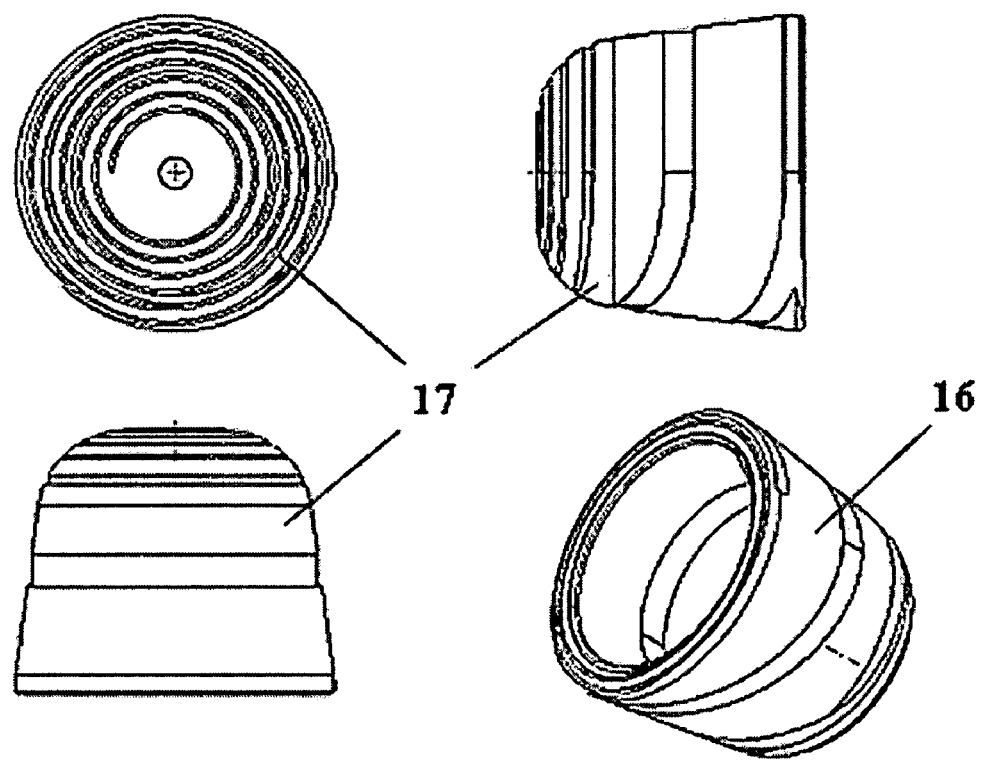
FIG. 17 is a schematic representation of another scanned and reproduced object obj in plastic, composite or papery material, as seen in the planes xy, yz, xz (module VT-MF$^{II}$—Mod. B printing).

FIG. 17 is a schematic representation of another scanned and reproduced object obj in plastic, composite or papery material, as seen in the planes xy, yz, xz (module VT-MF$^{II}$—Mod. B printing), the reference number 16 indicates an example of an object obj to be scanned and reproduced, 17 indicates the views of the reproduced object obj as seen in the planes xy, yz, xz.

Detailed descriptions will now be provided of the following:

1. Integrated module for the mathematical calculation and management of the informatics data (VT-Data$^{II}$);
2. Scanner module (VT-MS$^{II}$)
3. Fax-reproduction module (VT-MF$^{II}$).

Module VT-Data$^{II}$:

The operating principle of the electronic photo-optical system VT$^{II}$ for the acquisition of the Cartesian coordinates (x,y,z) of any kind of object obj is based on the mathematico-geometrical relationships between the object obj and the reference system.

Description of the logic of the reference system:

A. Acquisition of desired Cartesian coordinates (numerical matrices P, 3D, 3Dr and 3Dc):

a) Given a plane π on which the object obj is positioned, let said plane be rotatable about a point c, centre of rotation of π, with the axis of rotation perpendicular to the plane;

b) Position of the object obj with the condition that at least one point of the object obj should form part of the axis of rotation of π passing through c (as in [a] above);

c) Given a rotation of the plane π and the object obj resting on it about the axis of rotation, it follows that each point of the plane and the object obj describes a circumference having a radius equal to the distance between the generic point $P_i$ and the projection of $P_i$ onto the axis of rotation. Let the radius of rotation described by $P_i$ be called $RP_i$;

d) Given a second plane $\pi 1$, the exact description of which is defined by the matrix of the direction cosines of $\pi 1$, positioned in space, let us consider the orthogonal projections of the circumferences described by the points $P_i$ on $\pi 1$;

e) Since the projection of a circumference onto a non-parallel plane generates an ellipse, one concludes that: an observer at an observation point situated at infinity (i.e. a parallel-beam-type observer) with respect to the perpendicular passing through $\pi 1$ would see the circular motion of the point $P_i$ as an elliptic motion;

f) Let us utilize the rototranslation equations of a reference system with the first system (x,y,z) situated at the centre c of the plane $\pi$ and the second reference system (X,Y,Z) positioned on the plane $\pi 1$ with the directrix Z coincident with the straight line passing through c of $\pi$ and perpendicular to $\pi 1$ (directrix Z coincident with the straight line c-c1);

g) The matrix system associated with the rototranslation makes it possible to define coordinates from the system (x,y,z) to the system (X,Y,Z) and vice versa;

h) The observer at infinity with respect to $\pi 1$, who observes according to (X,Y,Z), is capable of deducing the exact positions on (x,y,z) by making use of the matrix equations. Given the positions X,Y on (X,Y,Z) and given also the position of the corresponding point z measured with respect to (x,y,z), the matrix system can be solved.

B. Description of the acquisition of the coordinates [x,y,z]:

a) Let the object obj be positioned on the base plane ($\pi$);

b) The initial position of the object obj with respect to the plane ($\pi$) and the digital image survey system ($\pi 1$) is defined with an angle equal to 0°;

c) A linear light beam projected parallel to the base plane ($\pi$), initially strikes the object obj at a position such that $z_1$=vertical level=0+(beam thickness)/2;

d) The digital image survey system photographs (shoots) the object obj and associates the position of angle=0° and $z_1$ with this "instant image photogramme/frame";

e) Subsequently the digital image survey system produces a series of n "instant image photogrammes/frames" associated with positions of angle=0° and $z_i$ with i=1:n corresponding to the levels $z_i = z_1 + (p \times i)$ for i=2 . . . n, with p=vertical scanning step (electronically manageable parameter);

f) Following completion of the sequence at angle=0°, the base plane ($\pi$) is made to rotate through angle=90°;

g) A sequence of n "instant image photogrammes/frames" associated with angle=90°/$z_i$ is then shot as in (e) above;

h) Following completion of the sequence at angle=90°, the base plane ($\pi$) is made to rotate to angle=180°;

i) A sequence of n "instant image photogrammes/frames" associated with angle=180°/$z_i$ is then shot as in (e) above;

j) Following completion of the sequence at angle=180°, the base plane ($\pi$) is made to rotate to angle=270°;

k) A sequence of n "instant image photogrammes/frames" associated with angle=270°/$z_i$ is then shot as in (e) above;

l) For the purposes of composing the 360° closed profile of the object obj, let us now consider, for each one of the 4 sequences of n photogrammes/frames of the surveyed digital images (angle=0°, angle=90°, angle=180°, angle=270°), the profile segment equal to 90° calculated on the bisectrix of the angle of incidence as interval −45°/+45° (FIG. 7);

m) The composition of the 4 surveyed profile segments is obtained by bringing the appropriate profiles back to the plane of angle=0° as follows:
the profile of angle=90° by changing the coordinates from: x90° to y0°, and y90° to x0°;
the profile of angle=180° by changing the coordinates from:
x180° to x0°, and y180° to −y0°;
the profile of angle=270° by changing the coordinates from:
x270° to y0°, and y270° to −x0°;
where the coordinates x,y for each system are positioned on the centre of rotation c, evaluated as projection of the incident ray onto the axis of rotation of the base plane $\pi$.

C. Data processing modalities:

a) Each image photogramme/frame, with which there is associated the angle parameter and the level z, is processed by means of optical filters and/or mathematical operations with a view to showing only the part of the object obj struck by the activated LED scanning beam;

b) The image processes as in (a) above is reduced by means of mathematical processing to a matrix of numbers corresponding to the image pixels;

c) The image decomposed in this manner can be associated with the plane coordinate reference system X,Y of which the points highlighted by the light beam represent the profile of the object obj projected onto the digital image-shooting plane $\pi 1$;

d) The matrix generated in this manner is of the (0, 1) type, such that to each numerical information 1 there corresponds a point of the profile of the object obj, and to each numerical information 0 there corresponds everything else; the continuous-line that unites all the points of type 1 corresponds to the profile of the object obj (referred to the angle and to z), projected onto the digital image-shooting plane $\pi 1$;

e) Having obtained the image profile associated with the angle and the level z, the composition of the 90° segments is carried out as in (l) and (m) of paragraph B in the image composition phase (FIG. 7);

f) At the end of the operation one obtains a set of n closed profiles corresponding to the level $z_i$; profile is here understood as a set of m coordinates of the type (xk, yk, $z_i$) with k=number of subdivisions of the profile=from 1 to m; each profile corresponds to a vector of the type m rows, 3 columns [x,y,z];

g) The composition of all the n vectors associated with the levels $z_i$ eventually generates the space matrix 3D of type and dimension 3D=[m n 3];

h) Since the dimension of the matrix that is being acquired is a function of the resolution of the digital image shooting (example 480×640, 1200×600 pixel), a scaling operation is carried out with a view to re-proportioning the horizontal subdivision (640) and the vertical subdivision (480) of the photograph scale to the real dimensions of the field of view, that is to say, given a known horizontal measure on the base plane, everything is re-proportioned to this value; for example: given the known measure of 10 cm on the base plane $\pi$ corresponding to an interval equal to 400 pixel, to every pixel there corresponds a reading interval equal to (10 cm)/400=0.4 cm=4 mm; this scaling operation is carried out only once at the end of the computation process by multiplying the matrix 3D by Sf (Sf=scale factor matrix), thus obtaining the matrix of the real coordinates of the object 3Dr=3D×Sf, still of the type [m n 3]—(module VT-MF$^{tt}$—Mod. A printing);

i) Generation of the colour information: prior to the digital shooting of every sequence of n images for the positions angle=0°, angle=90°, angle=180°, angle=270°, there is obtained a digital shot of the object obj without any position information associated with the activated LED beam; each of the 4 images obtained is defined as a colour sampling image 0°, 90°, 180°, 270°;

j) The map of profile points identified on the plane π1 can be associated with the corresponding image points of which the colour information is also known, as in (h) above;

k) The printing system integrated in the reproduction device VT-MF$^{II}$ utilizes the colour information associated with the points on π1, of the type [X,Y,Colour], rectified on the plane π [x,y,Colour].

D. Operation of rectifying the colour of the object obj:

a) Association of the coordinates on π1 with the image colour 3Dc=[X,Y,C], where C=number corresponding to the colour, which may be of type: figure comprised between 0 and 255 (information about 256-colour scale), or by using the RGB method with 3 numerical-type information items [0-255, 0-255, 0-255];

b) Association of the points translated onto the reference system (x,y,z) with the corresponding (X,Y,C);

c) Creation of colour curve: the realization of the cutting profile in the reproduction systems VT-MF$^{II}$ (Mod. A printing) utilizes the coordinates of the matrix 3Dr; for the purpose of colouring the aforesaid profiles, the positions of the points of 3Dr are associated with the positions of the matrix 3Dc in the following manner: considering the $i^{th}$ profile of 3Dr as a vector of type [x,y,$z_i$] consisting of m rows, the information of 3Dc [X,Y,C] with coordinates X,Y is associated with the positions i of the matrix 3D. With a view to realizing a continuous colour curve, use is made of broken-lines that unite consecutive points by linearly interpolating the known points of (X,Y,C) and real points (x,y,$z_i$).

E. Formulation of the matrices P, 3D, 3Dr, 3Dc; the operation is subdivided as follows:

1. Shooting digital image photogrammes/frames on plane π1: images taken with the LEDs not activated, for the generation of the colour information: No. 4 images corresponding to the positions of the object obj: colour sampling image 0°, 90°, 180°, 270°;

2. Shooting digital image photogrammes/frames on plane π1: images shot with the LEDs activated: $I_{i,zi}$=acquired image associated with the indices i=1:4 (images at angle=0°, angle=90°, angle=180°, angle=270°), $z_i$=1:n (scanning levels);

3. Processing of the images acquired in 1 and 2 above:

a) Processing the images $I_{i,zi}$ with a colour filter (optical filter or mathematical filter) that brings out only the image portions struck by the activated LED beam;

b) Extraction of the profile matrices $P_{i,zi}$ with indices i=1:4 (images at angle=0°, angle=90°, angle=180°, angle=270°), $z_i$=1:n (scanning levels) containing the profiles, utilizing the pixel position as coordinate system and associating the numerical information 1 with the profile points and the numerical information 0 with all the others; this extraction considers the profile segment corresponding to −45°/+45°, valued with respect to the directrix passing through the projection point of the level plane on the axis of rotation of the base plane and the straight line perpendicular to the image plane;

c) Rototranslation of the information from the digital image plane π1 to the rotating base plane π; the parameters are defined as:

d=horizontal measure of the distance between the centre c of the rotating base plane π and the projection of the centre c1 of the digital image plane π1;

v=vertical measure of the distance between the centre c of the rotating base plane π and the projection of the centre c1 of the digital image plane π1;

α=arctan(v/d);

T=vector of the translation coordinates of the Cartesian system from the image base plane: n=[0−dv]

R=rotation matrix of the Cartesian system from the image base plane:

$$R = \begin{bmatrix} 1 & 0 & 0 \\ 0 & \cos(\alpha - 90°) & \cos(\alpha) \\ 0 & \cos(\alpha - 180°) & \cos(\alpha - 90°) \end{bmatrix}$$

P=vector of the coordinates identified on digital image plane π1 with level Z associated with LED position=(X, Y, Z);

X=coordinate points of profile obtained from image;
Y=coordinate points of profile obtained from image;
Z=+z*sin(α)−(Y−z*cos(α))/tan(α)−$(d^2+v^2)^{1/2}$;
z=level of the LED position associated with the image.

F. Rototranslation of the Cartesian system from the plane π1 to the plane π:

a) 3D=matrix rototranslated from the plane π1 to the base plane π;

b) 3D=[P−T]*R

G. Generation of the matrix set 3Drr, 3Drrt for the radial coordinates system:

a) Given the matrices 3Dr and 3Dc, let us consider their re-computation in accordance with a new coordinate system of the radial-type. Having defined 3Dr as a matrix of type [x y z] and the associated matrix 3Dc [x y C], which has a composition of the type [x y z C], we can compute the transformation of the Cartesian coordinates from orthogonal to radial in accordance with the following definition:

Rg=Rg0+S/360*θ=winding radium with respect to the axis of rotation;
Rg=$(x^2+y^2)^{1/2}$;
Rg0=initial radium of the axis of the spiral winding;
θ=(Rg−Rg0)*360/S=winding angle [in degrees];
S=thickness of the spiral-wound sheet;

b) We now define the matrix describing the geometry of the object obj in the radial system as the matrix 3Drr=[Rg θ z] associated with the corresponding matrix 3Dc such as compose a space and surface-colour matrix of the type [Rg θ z C];

c) The matrix 3Drr makes it possible to construct the volume of the object obj on the basis of a spiral-wound axis of rotation having a thickness S; the templates to be consecutive cut can be obtained, respectively, from the space confine edges of the matrix set that describes the volume of the object obj (module VT-MF$^{II}$-Mod. B printing);

d) Given the matrix 3Drr, the cutting condition tg is obtained in accordance with the following logic: given 3Drr=[Rg θ z] ordered in accordance with increasing values θ, z, one defines the information:

*tg*=active=1(when $z_i \neq z_{i+1}$)

*tg*=inactive=0(when $z_i = z_{i+1\ Drr}$)

Having composed all the information into the vector [tg], one then composes the new matrix 3Drrt:

3*Drrt*=3*Drr*+*[tg]*=*[Rgθztg]*

In the rectification plane of the spiral, the cutting information vector [tg] constitutes the external confine of the object obj (module VT-MF$^{II}$-Mod. B printing).

Modulo VT-MS$^{II}$:

The digital photo-optical scanner module VT-MS$^{II}$ is the system that makes possible the acquisition of the data necessary for defining the numerical matrices 3Dr and 3Dc of the chromatic and space coordinates of the object obj and is made up of:

1. Rotating base plane on which there are placed the objects obj to be surveyed;
2. Digital image survey and acquisition system (photo camera or video camera);
3. System of luminescent LEDs capable of generating a linear light beam projected parallel to the rotating base plane on which the objects obj to be surveyed are supported.

The following points set out the definition of the characteristics:

a) The rotating base plane has a rotation pin at its centre, said pin enabling it to rotate through angles comprised between 0° and 360°, the movement may be of the manual rotation type, by mean of adjustment screws or of the motorized type, connected with the data management board;

b) The digital image survey and acquisition system is arranged such as to confer upon the photo camera or video camera employed the macro-type/parallel beam modality, with a specific angle ($\alpha$) respect to the base plane ($\pi$);

c) The LED system is situated on the vertical of the digital image acquisition device, it generates a linear light beam projected parallel to the rotating base plane in accordance with predetermined distances and movements that are either stepped or of the continuous, motor-controlled type. The positioning of the light beam is coordinated with the shooting sequence of the image photogrammes/frames, so that a particular position of the projected beam is associated with each acquired image; the LED system is linked to an electronically controlled kinematic mechanism that makes possible a movement in steps determined in accordance with z of the base plane $\pi$; when the images are acquired by means of a digital photo camera, the number of the images in the sequence from 1 to n is associated with the step position of the scanning light beam, i.e. to image 1 there corresponds a displacement step led/1, equal to a known measure that corresponds to the projection of the light beam moved along the extension of the vertical sliding axis of the device, image 2 corresponds to step led/2, etc. When the images are acquired by means of a video camera capable of realizing a sequence of nf images per second [images/s] and the LED system is displaced with a continuous-type motion at a speed of Vz [mm/s], the shooting parameters are associated in the following manner: let t be a generic instant of the shooting motion of the digitally acquired photogrammes/frames, measured from the beginning of the motion sequence, as regards the video camera shooting/movement of the LED scanning plane, we define:

N image=image number=t×nf

S image=displacement associated with image N image=t× Vz

When the shooting parameters nf and vz are understood in this manner, the level z of the object obj subjected to scanning can be defined by subdividing the total shooting time Tr into n steps, such that t=Tr/n=time interval between two consecutive images, i.e. when n is increased, one increases the definition of the numerical matrix 3D;

d) The hardware integrated in the module envisages the use of the method described in connection with the module VT-Data$^{II}$, paragraphs (A) to (E).

Module VT-MF$^{II}$:

The defined reproduction-fax module VT-MF$^{II}$ consists of a printer that makes possible the coloured three-dimensional duplication in plastic, composite or papery material of the external surface of objects obj that have been scanned or designed by means of CAD 3D.

This reproduction module provides to printing modalities, namely Mod. A printing, operated by means of the logic 3Dr and 3Dc when the supports of the plastic, composite or papery type are available in the form of sheets; and Mod. B printing, operated by means of the logic 3Drrt and 3Dc when the supports of the plastic, composite or papery type are available in the form of rolls.

Mod. A printing of the module VT-MF$^{II}$ reproduces the external surface of the object obj by processing by means of templating and superposing the plane surfaces (corresponding to the subdivision into parallel layers of the virtual object obj to be reproduced, in accordance with matrix 3Dr) of the chosen and employed supports of the plastic, composite or papery type when they are in the form of sheets (FIG. 12).

Mod. B printing of the module VT-MF$^{II}$ reproduces the external surface of the object obj by processing by means of templating and winding around an axis of rotation of the continuous surface (corresponding to the subdivision into consecutive spiral-shaped layers of the virtual object obj to be reproduced, in accordance with matrix 3Drr) of the chosen and employed supports of the plastic, composite or papery type when they are in the form of rolls (FIG. 17).

Associated with the cutting device of the reproduction module VT-MF$^{II}$ for processing the employed supports of the sheet-type and/or the roll-type (cut management in accordance with VT-Data$^{II}$ logic of type 3Dr and 3Drrt), is a printing device for the coloured reproduction of the external surface of the object obj with fidelity to detail and reproduction of the digital photographic type (printer management in accordance with VT-Data$^{II}$ logic of type 3Dc). Also comprised in the module is the data processing hardware and the system for connecting it to a PC and/or a network, with connection typologies that have already been described hereinabove.

The sequential cutting operation of the plane profiles (VT-MF$^{II}$-Mod. A printing), is contained in the data of the matrix 3Dr, because this matrix was generated by using the n planes of level $z_i$ into which the virtual volume of the object obj was decomposed; these decomposition planes, which are parallel and adjacent to each other, correspond physically to the employed supports of the sheet-type with their specific composition and structure of plastic, composite or papery material.

The continuous cutting operation of the spiral-shaped profiles of the angles of revolution paired (VT-MF$^{II}$—Mod. B printing), is contained in the data of the matrix 3Drrt, and envisages the construction of the object obj by means of wrapping around an axis of rotation that corresponds to the vertical axis z positioned at the centre of the plane $\pi$ and passing through the object obj; the continuous radial-coordinate surface of the object obj around this axis of rotation corresponding physically to the employed support of the roll-type having a thickness S and composed of plastic, composite or papery material.

The hardware contained in the system of the module VT-MF$^{II}$ assures the decomposition of the matrix 3Dr into n planes and the decomposition of the matrix 3Drrt into n spirals (Maximum value of radius=Rg max=Rg0+S/360*$\theta$ max; n=$\theta$ max/360), scaling the resolution and the subdivision of the planes and spirals in accordance with the needs of the user.

The in-the-round construction of the three-dimensional volume of the object obj is realized by means of the composition by specific jointing of the sections into which the initial volume of the object obj was subdivided and recomposed. This combinatorial property makes it possible to manage the reproduction of the dimensional volume of the object obj in a practically unlimited manner, so that there comes into being the possibility of reproducing the outline of any kind of object obj in plastic, composite or papery material and with dimensions that are neither restricted nor restricting by means of the subdivision into modular parts of a scale as required by the volume to be realized, previously processed by VT-Data$^{II}$ as numerical matrices 3Dr, 3Drrt and 3Dc.

The reproduction module VT-MF$^{II}$ described as fax-receiving apparatus is schematically made up as follows:
1) Space in which there are contained the trays on which the use material of the sheet-type is accommodated (Mod. A printing);
2) Space in which there is contained the axis/pin on which the use material of the roll-type is accommodated (Mod. B printing);
3) System for loading, aligning and predisposing the support of the sheet-type (in plastic, composite or papery material) for the cutting phase (Mod. A printing);
4) System for loading, aligning and predisposing the support of the roll-type (in plastic, composite or papery material) for the cutting phase (Mod. B printing);
5) Low-power laser cutting system brought into action in accordance with matrix 3Dr (Mod. A printing) and matrix 3Drrt (Mod. B printing);
6) System for separating the processed support of the sheet-type from its counter-outline (template)—(Mod. A printing);
7) System for separating the processed support of the roll-type from its counter-outline (template)—(Mod. B printing);
8) Colour printing system dedicated to the employed support of the sheet-type and the roll-type (in plastic, composite or papery material), brought into action in accordance with matrix 3Dc (Mod. A printing and Mod. B printing);
9) System for activating the obtained surface of the sheet-type (in accordance with the specific characteristics of the employed type of support), for the consequent adhesivation (Mod. A printing);
10) System for stacking and compacting the supports of the sheet-type processed (Mod. A printing);
11) System for compacting the supports of the roll-type processed (Mod. B printing).

The shaping of the objects obj as previously described is carried out with the help of cutting system of the low-power-laser type, the cutting head being electronically managed by the hardware of the module VT-MF$^{II}$ based on information obtained by means of the matrices 3Dr and 3Drrt; these modellings also permit the cutting of particular notches (pin spaces) arranged flush with and/or within the plane surface of the worked support (indicated by 26 in FIG. 11) of the specific separation insert of the employed support in plastic, composite or papery material (indicated by 22 in FIG. 8) for a predefined, subsequently consecutive series of pre-established planes and spirals of the object obj to be reconfigured.

These cut-outs generate the pin spaces utilized for uniting the processed parts of the object obj, union that is effected by inserting the corresponding coupling pins, which are of a shape identical with and equivalent to the cut-outs that have been made (indicated by 26 and 28, FIG. 14, reproduced with Mod. A printing—the position and the number of the pins necessary for joining the decomposed parts of the three-dimensional volume of the objects obj to be reconfigured is a function of the previously defined scale size of the objects obj).

The system is capable of reproducing the coloration of the outline (template) of the supports made of plastic, composite or papery material produced by both cutting systems of VT-MF$^{II}$ (Mod. A printing and Mod B printing), with a reproduction fidelity of the digital photography type; coloration corresponding to the $n^{th}$ profile colour of the volume of the object obj (matrix 3Dc), where the corresponding colour information is associated with each profile point and/or defined by the user by means of information transferred from a CAD 3D design.

The plastic, composite or papery materials constituting the various types of supports (sheet-type/Mod. A printing and roll-type/Mod. B printing) employed by the devices VT-MF$^{II}$ for the realization of the outlines of objects obj are standardized as regards shape, perimeter and specific separation insert (indicated by 21 and 22, FIGS. 8 and 16). Each support typology has specific composition characteristics that envisage its being paired with the appropriate specific material of adhesivation and coloration.

Mod. A printing and Mod. B printing phases of the module VT-MF$^{II}$ can be described as follows:
1. Loading of the plastic, composite or papery support of the sheet-type from its feeder contained onto the cutting base plane (Mod. A printing);
2. Loading of the plastic, composite or papery support of the rool-type from its axis/pin contained onto the cutting base plane (Mod. B printing);
3. Sequential cutting of the $n^{th}$ profile plane into which the object obj has been subdivided by mean of matrix 3Dr (Mod. A printing), and separation of the positive templates (outlines) obtained from theirs correspondingly generated negative counter-templates;
4. Continuous cutting of the $n^{th}$ angles of revolution paired into which the object obj has been subdivided by mean of matrix 3Drrt (Mod. B printing), and separation of the positive templates (outlines) obtained from theirs correspondingly generated negative counter-templates;
5. Colour printing by means of an inkjet system or a specific system compatible with the employed sheets of a plastic, composite or papery type, in accordance with matrix 3Dc (Mod. A printing);
6. Colour printing by means of an inkjet system or a specific system compatible with the employed rolls of a plastic, composite or papery type, in accordance with matrix 3Dc logic (Mod. B printing);
7. Sensitization and activation of the processed support of the sheet-type for adhesivation in accordance with the specific characteristics of the employed plastic, composite or papery material (Mod. A printing) processed as 1, 3 and 5 above;
8. Position of the processed support of the sheet-type on the stacking tray to receive the subsequent supports of the sheet-type processed as in 1, 3, 5 and 7 above (Mod. A printing);
9. Compaction of the supports of the sheet-type, processed as in 1, 3, 5; 7 and 8 above, by means of consecutive adhesivation of the step-by-step type and final fixing, in accordance with the specific characteristics of the employed material (Mod. A printing);
10. Compaction of the supports of roll-type, processed as in 2, 4 and 6 above, by means of consecutive adhesivation in accordance with the specific characteristics of the employed material (Mod. B printing);
11. (The presence in the module VT-MF$^{II}$ of a printing head makes it possible for the machine to operate also as a simple fax device in common use, drawing the common paper to be employed for this purpose from an attached dedicate store).

The final three-dimensional configuration of the object obj acquired from the scanner module VT-MS$^{II}$ and/or generated in a PC by means of CAD 3D design that is to be reproduced by means of the reproduction module VT-MF$^{II}$ in plastic, composite or papery material is obtained from the combination by jointing and blockage of the shaped pieces of the sheet-type and/or the roll-type by means of the joints assured by the coupling pins inserted in the generated cavities corresponding to them made on the supports in accordance with the enounced logic, these cavities being specular and perfectly aligned.

These shaped and jointed pieces, which determine the sectioned parts of the volume of the object obj to be recomposed, are coloured in accordance with the enounced logic and a chromaticity and tonal gradation corresponding to the real colour of the surface of the object obj subjected to scanning, with a reproduction fidelity of the digital photography type for both Mod. A printing and Mod. B printing modalities.

The invention claimed is:

1. An electronic photo-optical system for surveying, digitalizing and reproducing the external surface of a three-dimensional object, virtually or in plastic, composite or papery material, comprising an integrated module for calculating and managing informatics data, a scanner module and a reproduction module, characterized in that said integrated calculation module (VT-Data$^{II}$) describes the mathematical logic utilized in the hardware in the scanner module (VT-MS$^{II}$) and the reproduction module (VT-MF$^{II}$) and carries out the operations of:
   i) surveying, by means of a digital photo camera or a digital image survey and acquisition system, an image sequence of the object to be acquired associated with a consecutive and synchronized sequential projection, positioned and moved in predetermined steps, of a linear light beam projected parallel to the plane (x,y) on which the object is placed and striking the surface of the object to be surveyed, said surveying step including the acquisition of data representing the colours of the surface of said object;
   ii) processing the information acquired as in i) above and reproducing the mathematics that describe the geometry of the external surface of the acquired object taken as model, generating the space coordinates of said object in accordance with a Cartesian reference system with three axes (x,y,z) as logic of the integrated calculation model (VT-Data$^{II}$);
   iii) transferring the mathematical data acquired as in i) and ii) above to a PC for a virtual reproduction of the acquired object; rendering it available by means of specific software to a CAD 3D systems in order to be able to carry out modification interventions;
   iv) transferring to a remote station the mathematical data acquired as in i), ii) and iii) above in order to reproduce there by means of reproduction module (VT-MF$^{II}$) a colour outline in plastic, composite or papery material of the external surface of the object acquired by the scanner module (VT-MS$^{II}$) of the external surface of a PC-generated virtual object transferred by means of specific software from a CAD 3D file to a numerical matrix of the Cartesian coordinates of the object 3Dr, a numerical matrix describing the geometry of the object in the radial system with template cutting information 3Drrt and a numerical matrix associated with the colours of the object 3Dc-type data file, in accordance with the logic indicated by the integrated calculation module (VT-Data$^{II}$);
   v) colour printing the external surface of the object to be reproduced in plastic, composite or papery material in accordance with the 3Dc-type data file format, in accordance with the logic indicated by the integrated calculation module (VT-Data$^{II}$).

2. An electronic photo-optical system in accordance with claim 1, characterized in that the integrated informatics data calculation and management module (VT-Data$^{II}$) generates, starting from information obtained from digital images, a numerical matrix 3Dr representing the coordinates (x,y,z) of the external surface of an object to be calculated; a numerical matrix 3Dc representing the colour coordinates of said object subjected to scanning; a second matrix set 3Drr, 3Drrt obtained by a 3Dr re-computation in accordance with a radial-type coordinate; the matrices computation being the result of the following steps:
   acquiring the data using the rototranslational equations of the Cartesian reference system with axes (x,y,z) positioned at the centre c of a plane π on which the object rests and the second reference system (X,Y,Z) positioned at the centre c1 of a plane π1 in which the images of the object are obtained by means of the digital acquisition system; the directrix Z coinciding with the straight line through the points c of π and c1 of π1 and with the focal direction of the parallel-beam digital photo-electric apparatus employed for acquiring the images; the object to be scanned being placed on the plane π and the digital image survey device being situated on the plane π1, the planes π and π1 being translated and inclined with respect to each other and the equation representing their relationship being 3D such that:

$$3D=[P-T]*R$$

R=rotation matrix of the Cartesian system from the image base plane:

$$R = \begin{bmatrix} 1 & 0 & 0 \\ 0 & \cos(\alpha - 90°) & \cos(\alpha) \\ 0 & \cos(\alpha - 180°) & \cos(\alpha - 90°) \end{bmatrix}$$

P=vector of the coordinates identified on image plane π1 with level Z associated with LED position=(X,Y,Z);
X=coordinate points of profile obtained from image;
Y=coordinate points of profile obtained from image;
Z=+z*sin(α)−(Y−z*cos(α))/tan(α)−(d$^2$+v$^2$)$^{1/2}$;
z=level of the LED position associated with the image;
T=vector of the translation coordinates of the Cartesian system of the image base plane: T=[0−d v];
d=horizontal measure of the distance between the centre c of the plane π and the projection of the centre c1 of the plane π1;
v=vertical measure of the distance between the centre c of the plane π and the projection of the centre c1 of the plane π1;
α=arctan(v/d);
generating the matrix set for the radial coordinate system by transforming the Cartesian coordinates from orthogonal to radial in accordance with the following definition:

$Rg=Rg0+S/360*\theta$=winding radium with respect to the axis of rotation

Rg=(x$^2$+y$^2$)$^{1/2}$
Rg0=initial radium of the axis of the spiral winding
θ=(Rg−Rg0)*360/S=winding angle [in degrees]
S=thickness of the spiral-wound sheet
the geometry of the object in the radial system is defined as the matrix 3Drr=[Rg θ z] associated with the corresponding matrix 3Dc such as compose a space and surface-colour matrix of the type [Rg θ z C]; the matrix 3Drr allowing construction of the volume of the object on the basis of a spiral-wound axis of rotation having a thickness S; the templates to be consecutively cut can be obtained, respectively, from the space confine edges of the matrix set that describes the volume of the object; given the matrix 3Drr, the cutting condition tg is obtained in accordance with the following logic: given 3Drr=[Rg θ z] ordered in accordance with increasing values θ, z, the following information is defined:

$tg$=active=1(when $z_i \neq z_{i+1}$)

$tg$=inactive=0(when $z_i = z_{i+1\ Drr}$)

having composed all the information into the vector [tg], the new matrix 3Drrt is composed as follows:

$3Drrt = 3Drr + [tg] = [Rg\theta ztg];$ whereby the object to be scanned, placed on the plane π in a first position defined as angle 0° with respect to the axis perpendicular to the plane π passing through its centre c, is struck by an LED light beam situated at a vertical level z with respect to the plane π and the digital photo-electric system of the parallel-beam type employed for the acquisition of the images, corresponding to the plane π1, sees the scanned object struck by the LED light beam with which there is associated the vertical level z; the digital photo-electric system surveys all the images of the object in the angle 0° position at the various vertical levels comprised between z=0 and the height of the object by means of its subdivision into n parts, subsequently repeating the same operations for the rotations of the object into angular positions of 90°, 180°, 270° on the plane π with respect to the angle 0° of π1; the acquired images, translated into numerical matrices, having dimensions corresponding to the number of pixels utilized by the chosen format in the digital image acquisition system with numerical values corresponding to the real colour of the surveyed object, each acquired image being translated into a numerical matrix, while only the color pixels struck by the LED beam are mathematically selected, converting these pixel positions into the numerical value 1 and associating the numerical value 0 with the remaining image pixels not struck by the beam, the matrices recomputed in this manner having dimensions corresponding to the number of image pixels, according to the horizontal and vertical directions, of which the positions of numerical value 1 correspond to the profiles associated with the vertical levels z, of these profiles there being furthermore considered a radial segment corresponding to −45°/+45° with respect to the reference angle (0°, 90°, 180° and 270°) and subsequently recomposed into 90° segments (−45°/+45°) until they describe a complete 360° profile; all this complete profile information, forming part of the plane π1 with reference system (X,Y,Z) and associated with the n vertical levels, being translated into the reference system (x,y,z) by means of said rototranslation matrix, of which the final result represents the surface of the scanned object in Cartesian coordinates, i.e. the matrix 3D, which is subsequently multiplied by the scale factor Sf that reporoportions all the information to the real scale of the acquired object, obtaining the numerical matrix 3Dr=3D×Sf, the generation of the colour information being carried out by utilizing four images at rotation angles 0°, 90°, 180°, 270°, images acquired without the LED beam projected, and subsequently recomposed into 900 segments by utilizing segments of −45°/+45° relative to the reference positions of the angles 0°, 90°, 180°, 270°, all the information assembled in this manner being translated into a numerical matrix 3Dc in which the point represent the pixel position information and the corresponding colour number, which may be of the type of a 256-colour scale [0-255] or for the RGB type [0-255/0-255/0-255], the pixel positions of this matrix 3Dc corresponding to the respective positions of the numerical coordinate matrix 3D.

3. An electronic photo-optical system in accordance with claim 1, characterized in that the integrated module for the mathematical calculation and management of the informatics data (VT-Data$^{II}$) carries out the operations of:
   formulating the resolution of the digital image survey system and the dimensional level parameter on the z-axis associated with the motion of the continuous or step-by-step type of a plane of the scanning light beam projected parallel to the base plane;
   acquiring the data relating to the external surface of a pre-existing object taken as model and subjected to scanning;
   mathematically processing the acquired data, translating them into Cartesian coordinates and generating a data file (numerical matrices 3D, 3Dr, 3Drr, 3Drrt, 3Dc);
   managing the whole of the data by means of a dedicated software;
   managing the data by means of hardware capable of acquiring and processing data and user interface software, the hardware being integrated into the mother board of the modules VT-MS$^{II}$, VT-MF$^{II}$ with specific VT$^{II}$ softwares;
   utilizing the numerical matrix 3Dr for interfacing, by means of translation into CAD 3D format, with the three-dimensional formats of the CAD 3D systems;
   using the external geometry of the acquired object available to CAD 3D for a rendering of the surface to be presented in a PC;
   importing data relating to the surfaces of objects from CAD 3D systems, translating them into the specific coordinate of the orthogonal and radial-type format system of the device (matrices 3Dr, 3Drr, 3Drrt and 3Dc);
   processing the data files by scaling the dimensions of the object either directly as desired and/or modifying them by means of the CAD 3D import-export system;
   utilizing the numerical matrices 3Dr, 3Drrt and 3Dc, obtained by acquisition or by import from CAD 3D, for the transmission of the data to the reproduction module VT-MF$^{II}$ either locally and/or by means of a network, wireless system and/or a direct telephone line to a remote station;
   by means of the specific coordinate format system: orthogonal type format and/or radial type format (refer to matrices 3Dr, 3Drrt and 3Dc) reproducing the volume of the object in plastic, composite and papery material and reproducing the corresponding colour with a fidelity of the digital photography type.

4. An electronic photo-optical system in accordance with claim 1, characterized in that the scanner module (VT-MS$^{II}$) carries out the operations of:
   surveying and acquiring digital images or digital frames of any kind of object in predeterrmined angular positions;
   surveying and acquiring digital images or digital frames of the predetermined sequentially stepped positions of a plane of a LED-type light beam that is projected parallel to the base plane on which the object subjected to scanning is placed and strikes said object, associating with this predefined sequential projection active along the image-shooting field of the employed digital system a synchronized motion such that this motion can be either continuous or made up of predetermined steps; in the case of continuous motion there is associated a video camera shot such as to obtain correspondence between photogrammes/frame and displacements in each unit of time, the photogrammes/frames and displacements coinciding with predefined and therefore known plane measures; when the motion is stepped, with each predefined position of the plane of the scanning beam there is associated the corresponding image obtained by the photo camera;

providing, by means of digital acquisition, the data needed for the computation of the numerical matrices of the space coordinates 3Dr and its corresponding colour matrix 3Dc in accordance with said logic (VT-Data$^{II}$).

5. An electronic photo-optical system in accordance with claim 1, characterized in that the scanner module (VT-MS$^{II}$) comprises:

a digital photo camera or a digital surveying and image acquisition system placed such as to have image-shooting plane with a photographic system of the macro type, and with the inclination of the shooting plane regulated in accordance with predefined angular position with respect to the framed rotating base plane;

an LED system positioned on the vertical of the digital image-shooting device capable of generating a linear chromatic light beam projected parallel to the rotating base plane carrying the object to be scanned; the light beam is moved in coordination with stepped or continuous motion sequence of the employed digital image-shooting system, so that with each acquired image there is associated also the position with respect to the base plane of the projected light beam striking the object, i.e. the distance between the plane and the beam.

6. An electronic photo-optical system in accordance with claim 1, characterized in that the reproduction module (VT-MF$^{II}$) carries out the operations of:

reproducing and colouring in plastic, composite and sheet-type papery material support, the external surface of a virtual object to which the orthogonal-type format numerical matrices 3Dr and 3Dc of the integrated calculation module (VT-Data$^{II}$) refer; or reproducing and colouring in plastic, composite and roll-type papery material support, the external surface of a virtual object to which the radial-type format numerical matrices 3Drrt and 3Dc of the integrated calculation module (VT-Data$^{II}$) refer;

for the sheet-type support: sequentially cutting the profiles of the object to be reproduced in the n planes of which it is composed, corresponding materially to employed reproduction supports of a plastic, composite or papery type, and said cutting operation being contained in the data of the matrix 3Dr, because the n planes of level z of the volume of the object were utilized for generating this matrix; the hardware contained in the module system carrying out the decomposition of the matrix 3Dr into the n planes, scaling the resolution as desired and the subdivision of the planes in accordance with the needs of the user, the cutting can be perpendicular or angular to the cutting base plane;

for the roll-type support: continuously cutting the profiles of the object to be reproduced in the n spiral-wound planes of which it is composed, corresponding materially to employed reproduction supports of a plastic, composite or papery type, said cutting operation being contained in the data of the matrix 3Drrt; the hardware contained in the module system carrying out the decomposition of the matrix 3Drr into the n planes wound as a spiral around the axis rotation, and desired scaling resolution, the cutting can be perpendicular or angular to the cutting base plane.

7. An electronic photo-optical system in accordance with claim 1, characterized in that the reproduction module (VT-MF$^{II}$) comprises:

a space in which there are contained trays in which a support of sheet-type is stored; or a space in which there is contained an axis/pin in which a support of roll-type is stored;

a system for loading, aligning and predisposing the chosen plastic, composite or papery support of sheet-type for the cutting phase; or a system for loading, aligning and predisposing the chosen plastic, composite or papery support of roll-type for the cutting phase;

a low-power laser cutting system brought into action in accordance with matrices 3Dr and 3Drrt logic;

a colour-printing system adapted to the chosen plastic, composite or papery support, brought into action in accordance with matrix 3Dc logic using 3Dr data for the sheet-type and 3Drr data for the roll-type;

a system for sensitizing the processed surface for a subsequent adhesion phase for the sheet-type support employed;

a system for stacking and compacting the sheet-type supports processed as indicated above;

a fax-type printing head.

8. An electronic photo-optical system in accordance with claim 7, characterized in that the reproduction module (VT-MF$^{II}$) carries out the following operations:

loading the plastic, composite or papery sheet-type support from its feeder-tray onto the cutting base plane;

loading the plastic, composite or papery roll-type support from its axis/pin onto the cutting base plane;

cutting an n$^{th}$ plane profile into which the object has been subdivided in accordance with matrix 3Dr logic, and separation of the positive outline-template thus obtained from the corresponding negative counter-template for sheet-type support;

cutting an n$^{th}$ spiral-wound profile into which the object has been subdivided in accordance with matrix 3Drrt logic for roll-type support;

colour-printing by means of an inkjet system or a system compatible with the employed plastic, composite or papery supports in accordance with matrix 3Dc matrix according with 3Dr logic for the sheet-type supports and according with 3Drr logic for the roll-type supports;

sensitisation and activation of the processed sheet-type support for adhesion in accordance with the specific characteristics of the employed plastic, composite or papery material;

positioning of the shaped sheet-type support on the specific stacking tray for receiving the supports in an appropriate sequence;

compaction of the sheet-type supports, effected by means of consecutive adhesion of the step-by-step type and with fixing and assembly of the final supports in accordance with the specific characteristics of the employed material;

three-dimensional in-the-round configuration of the acquired object by means of specific joining of the sheet-type and the roll-type supports, coupling the coloured sections of the volume of the object by means of coupling pins inserted in the corresponding cavities generated in accordance the enounced logic.

9. An electronic photo-optical system in accordance with claim 8, wherein the sheet-type or the roll-type supports that reproduce and realize outlines of objects subjected to scanning or obtained from a CAD 3D design (system) are characterized in that they are made of plastic, composite or papery material, are standardized as regards form, perimeter and separation inserts suitable for separating the guide edge of the processed outline template in accordance with said logic; each sheet-type or roll-type supports having specific characteristics that pair them with the corresponding colouring material, the shaping being in accordance with matrices 3Dr and 3Drrt, the cutting of particular cavities at the base of some sections of the object to be reconfigured being for seen in accordance with said shaping to generate the pin spaces or cavities utilized for uniting the processed parts of the object by means of specific insertion and coupling pins having outlines equal to the cut cavities, the position and the number of the pins needed for a coupling being a function of the dimensions for the object to be reproduced, and the colouring of the sheet-type or roll-type supports being carried out in accordance with the colour information received from the matrix 3Dc.

* * * * *